United States Patent [19]

Yoshino et al.

[11] 3,854,010

[45] Dec. 10, 1974

[54] TIME DIVISION MULTIPLEXING TRANSMISSION SYSTEM

[75] Inventors: Takehiko Yoshino, Yokohama; Hisakichi Yamane; Eiichi Sawabe, both of Tokyo; Akio Yanagimachi, Kawasaki; Masaaki Eukuda, Tokyo; Tatsuo Kayano, Tokyo; Michio Masuda, Tokyo; Teruhiro Takezawa, Tokyo; Katsuo Mohri; Hiroaki Nabeyama, both of Yokohama, all of Japan

[73] Assignees: Nippon Hoso Kyokai; Hitachi Limited; Hitachi Electronics, Ltd., all of Tokyo, Japan

[22] Filed: May 18, 1973

[21] Appl. No.: 361,581

[30] Foreign Application Priority Data

May 23, 1972 Japan .............................. 47-50987
May 23, 1972 Japan .............................. 47-50988

[52] U.S. Cl. .......................... 179/15 BS, 178/69.5 R
[51] Int. Cl. .............................................. H04j 3/06
[58] Field of Search ............ 178/69.5 R; 179/15 BS, 179/15 BC, 15 BY

[56] References Cited

UNITED STATES PATENTS

| | | | |
|---|---|---|---|
| 3,740,478 | 6/1973 | Breant | 179/15 BS |
| 3,754,102 | 8/1973 | Clark | 179/15 BS |
| 3,769,587 | 10/1973 | Matsuo | 178/69.5 R |
| 3,777,062 | 12/1973 | Ogawa | 179/15 BS |

*Primary Examiner*—Ralph D. Blakeslee
*Attorney, Agent, or Firm*—Stevens, Davis, Miller & Mosher

[57] ABSTRACT

A time division multiplexing transmission system transmits first and second information signals in turns at a time rate of an integer ratio, said first and second information signals being divided at periods of first and second signals. At a transmitter end there are provided means for producing said first and second signals and means for forming a digital synchronizing signal having a given relation to said first and second signals, said digital synchronizing signal being composed of a synchronizing information consisting of a pulse chain having a given repetition frequency and a control signal also consisting of a pulse chain. At a receiver end at first said synchronizing information is extracted from an incoming signal and then said control signal is extracted on the basis of said extracted synchronizing information so as to produce first and second synchronizing signals having frequencies which are equal to those of said first and second signals, respectively and said first and second information signals are reproduced by means of said first and second synchronizing signals.

29 Claims, 32 Drawing Figures

TIME DIVISION MULTIPLEXING TRANSMISSION SYSTEM

The present invention relates to a time division multiplexing transmission system and more particularly relates to a time division multiplexing transmission system for transmitting video signals of a plurality of still pictures and pulse code modulated (PCM) audio signals related thereto by turns at a time rate of, for example 1 to 2 television frames.

A type of broadcasting which is able to conform with the needs of the variety and individuality of human life can be considered one of the ideals of future broadcasting. Super multiplexing still picture broadcasting elicits great interest of broadcasters and educators as an economical and technological means through which a great deal of information can be conveyed.

The concept of still picture transmission by television signals has been reported by W. H. Hughes et al., at Oklahoma State University. This system has been planned for a cable transmission system which is capable of two-way transmission. But, they did not report the details of sound transmission. In most cases, it is advantageous to transmit the sound together with the picture because, in general, watching television without sound does not use the human senses well, and it is less effective for viewers. Therefore, it has been desired to develop a novel transmission system of still pictures and corresponding sounds in order to study the most effective use of still picture broadcasting and the acceptability of still pictures by viewers.

The present invention is to provide a novel transmission system which can transmit still pictures together with sounds related thereto. It should be noted that the present invention is not limited to a transmission system for still pictures and their related sounds, but may be used to transmit television video signals or facsimile signals which are divided into scanning periods and any other time division multiplexed information signals in the form of PCM, PPM (pulse position modulation), PWM (pulse width modulation) or PAM (pulse amplitude modulation) signal. However, for the sake of explanation, in the following description the transmission system for transmitting still pictures and related sounds as television signals through a television transmitting path will be explained. That is to say, video signals of still pictures and audio PCM signals are transmitted on the same transmission path at a rate of 1 to 2 television frames of NTSC system. Thus video signals of each still picture are transmitted in one frame period (one-thirtieth seconds) as quasi-NTSC signals and audio PCM signals are transmitted in successive two frame period (one-fifteenth seconds). A plurality of still pictures and their related sounds constitute a single group termed as a program. At a transmitter end, this program is transmitted repeatedly and at a receiver end one can select a desired still picture and its related sound from the transmitted program. At the transmitter end there may be provided a plurality of programs and a first program is transmitted repeatedly in a given time period and then a second program is transmitted repeatedly in a next given time period and so on. And at the receiver end one can select a desired program from a plurality of programs. A time duration of a program is established with considering various factors such as amounts of information to be transmitted, i.e., the number of still pictures, necessary time duration of sounds, etc., property of a transmission path and its bandwidth, complexity of apparatuses at transmitter and receiver ends, permissible access time (permissible waiting time) on the basis of psychological characteristic of viewers. In the embodiment described hereinafter, a time duration of a program is determined to five seconds.

In the still picture-audio PCM multiplexing transmission system, if the frequency of a horizontal synchoronizing signal for the video signal is equal to that of the PCM frame synchronizing signal, after the synchronization is once established the synchronization can easily be maintained in video signal periods and also in audio signal periods. However, a transmission bandwidth of the transmission path is limited and the audio signal must be transmitted in the given number of channels, so that the frequency of the PCM frame synchronizing signal, i.e., the frequency of an audio sampling signal must be determined on account of the transmission bandwidth and the number of channels. This results in that the frame frequency of the audio PCM signal is not always identical with the horizontal synchronizing frequency of the video signal.

Besides the above mentioned transmission system for transmitting the still pictures and their related sounds, there are many transmission systems in which a first information signal and a second information signal are transmitted in turns at a given time rate and a frequency of a synchronizing signal for the first information signal differs from that for the second information signal. For example, if a facsimile signal of high quality and a facsimile signal of low quality are transmitted in turns at a certain time rate, a sampling frequency, i.e., a primary scanning frequency of the high quality facsimile signal must be higher than that of the low quality facsimile signal. In such a case at a receiver end both of these sampling frequencies must be reproduced in order to establish a correct synchronization.

The present invention has for its object to provide a novel transmission system for transmitting first and second information signals in turns at a time rate of an arbitrary integer ratio, wherein a frequency of a synchronizing signal for the first information signal can be different from that for the second information signal.

It is another object of the invention to provide a time division multiplexed transmission system, wherein a ratio of a frequency of a synchronizing signal for a first information signal and that for a second information signal may be an arbitrary integer.

It is another object of the invention to provide a time division multiplexed transmission system, wherein a frequency of the horizontal synchronizing signal for the video signal of still pictures may be different from a frequency of the audio PCM, PPM, or PAM frame synchronizing signal of sounds related to said still pictures.

It is another object of the invention to provide a transmission for use in the time division multiplexed transmission system for transmitting first and second information signals in turns at a given time rate with different synchronizing signal frequencies for said first and second information signals.

It is another object of the invention to provide a receiver for use in the time division multiplexed transmission system, wherein synchronizing signals of different frequencies for the first and second information signals can be regenerated easily and positively.

It is still another object of the invention to provide a receiver for use in the time division multiplexed transmission system, wherein once the synchronization has been established, the synchronous condition can be kept even if the transmitted synchronizing signal is affected by noise or even lost partially.

It is further another object of the invention to provide a receiver for use in the time division multiplexed transmission system, wherein the receiver is not pulled into a spurous snychronization by signals in the transmitted signal which are similar to the synchronizing signal in the transmitted signal, but can be drawn into a correct synchronization.

Now the present invention will be explained in detail with reference to the accompanying drawings in which:

FIGS. 1*a*, 1*b* and 1*c* show constructions of a master frame, a sub-frame and a video-audio frame of video and audio signals transmitted by a time division multiplexing transmission system according to the invention, FIG. 1*d* illustrates a portion of said signal which includes a control frame and FIG. 1*e* shows a manner of effecting an audio PCM signal allocation;

Figure 7:
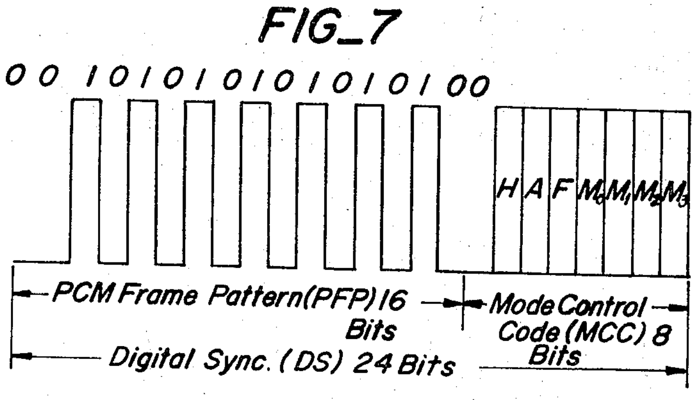
Figure 8:
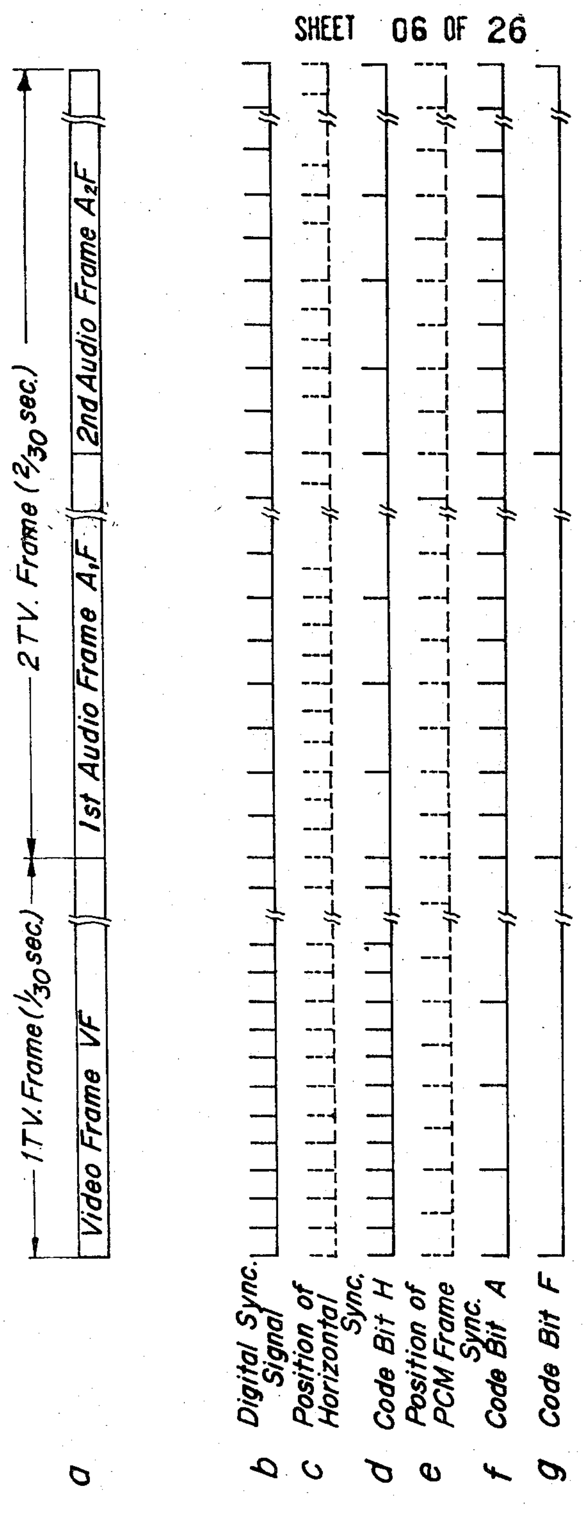
Figure 16:
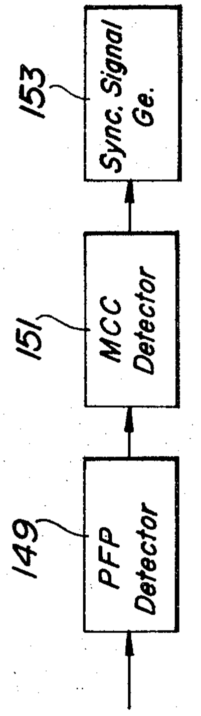
Figures 9, 10:
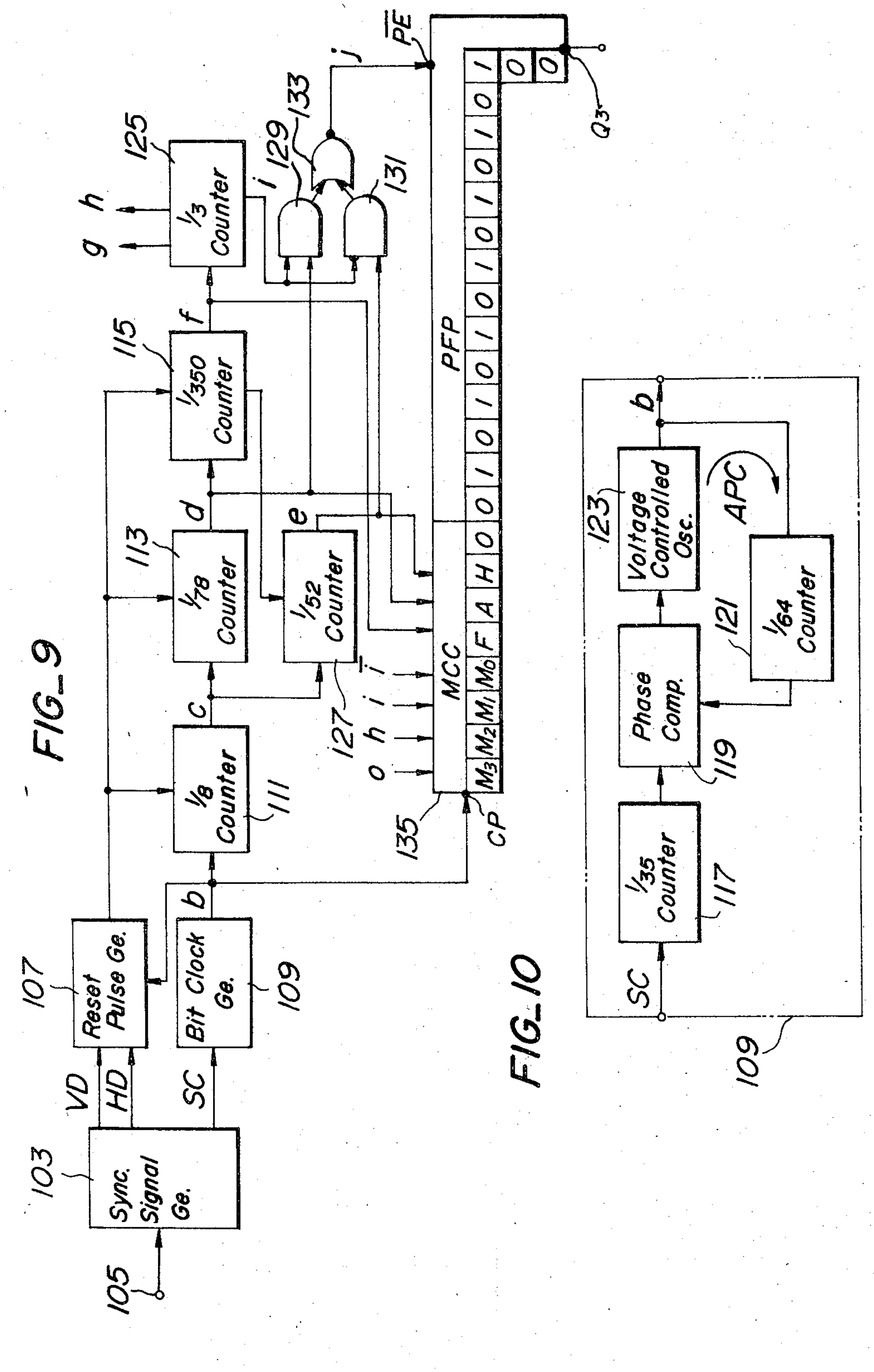
Figure 11:
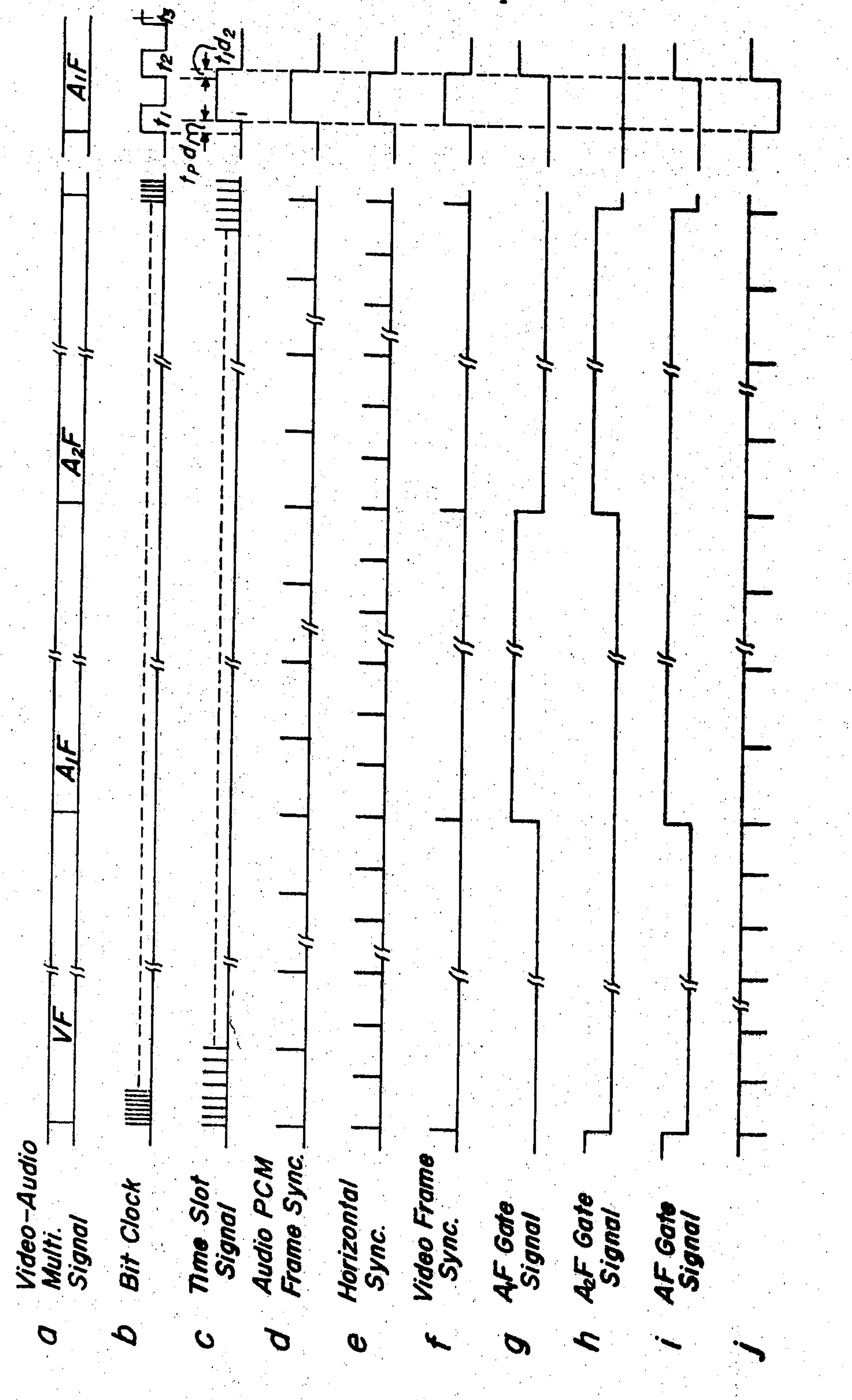
Figure 12:
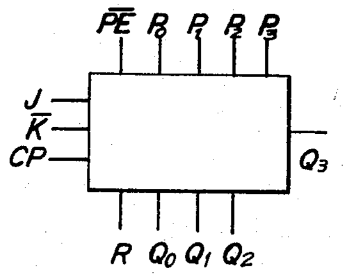
Figure 13:
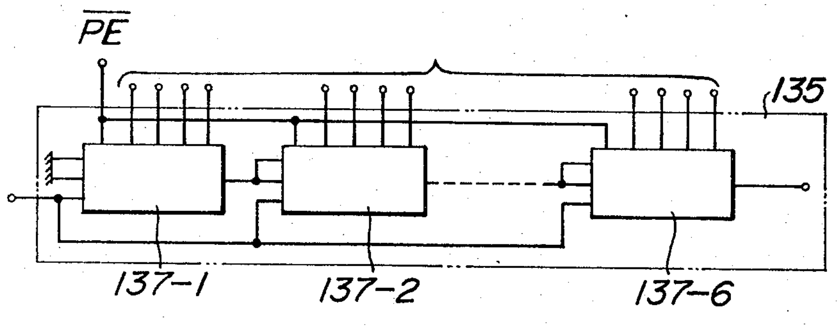
Figure 14:
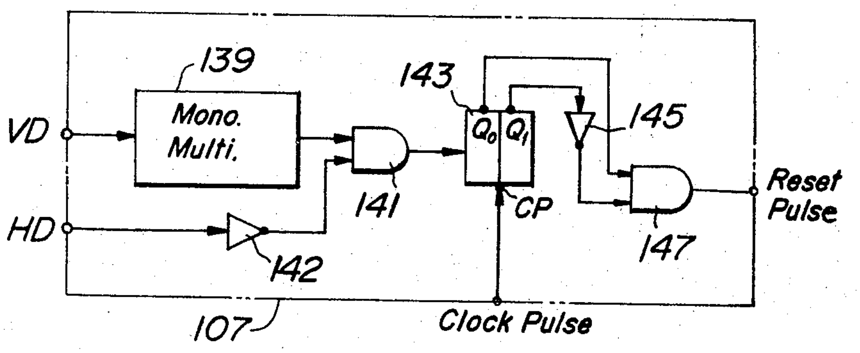
Figure 15:
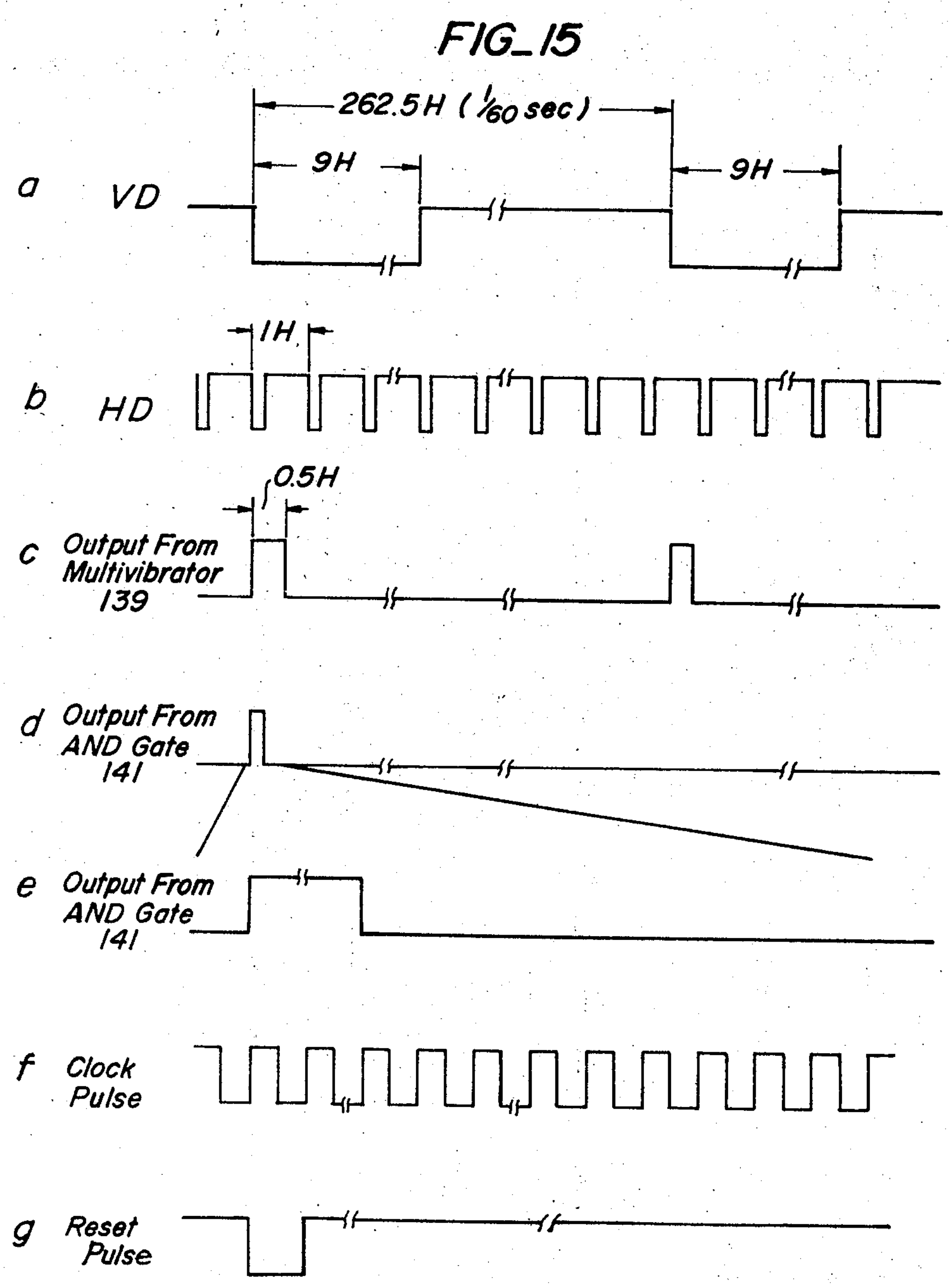
Figure 17:
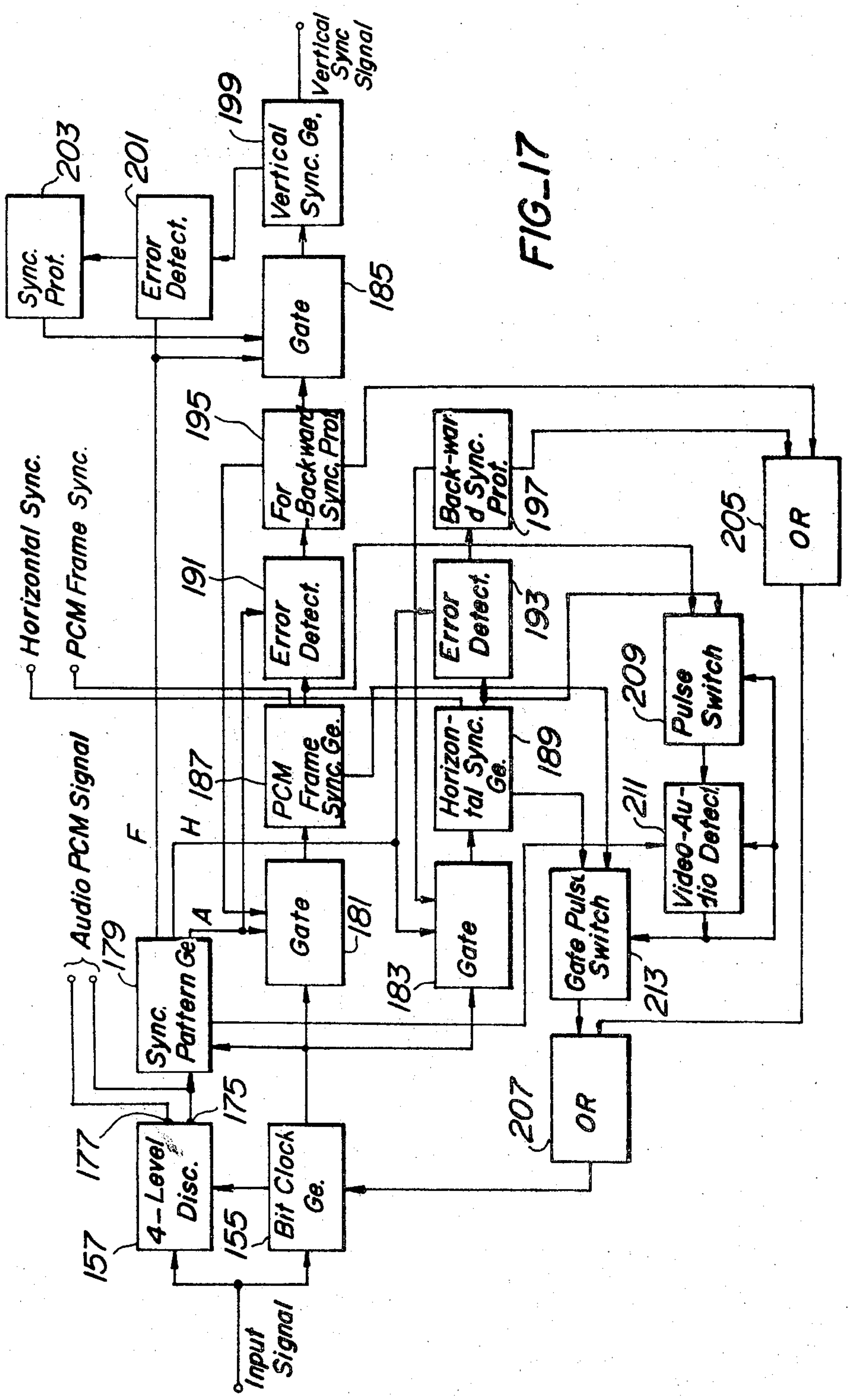
Figure 18:
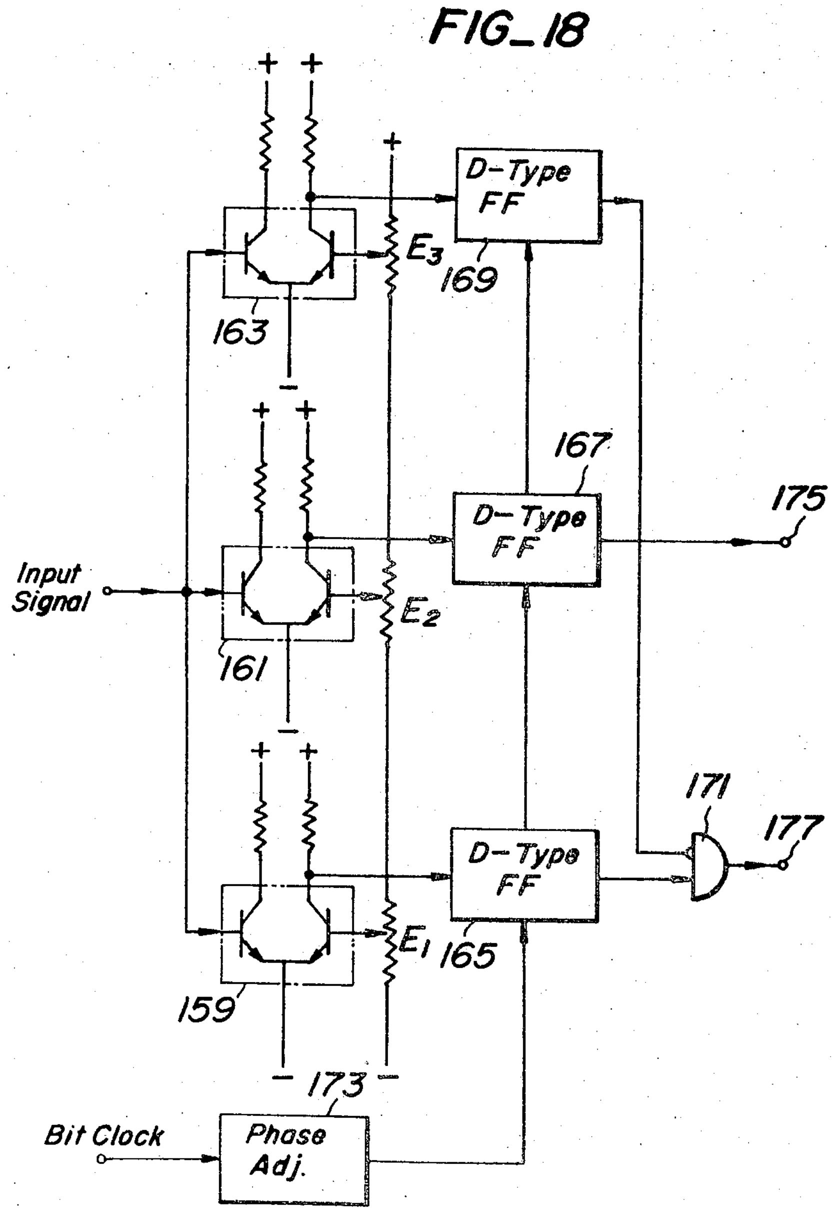
Figure 19:
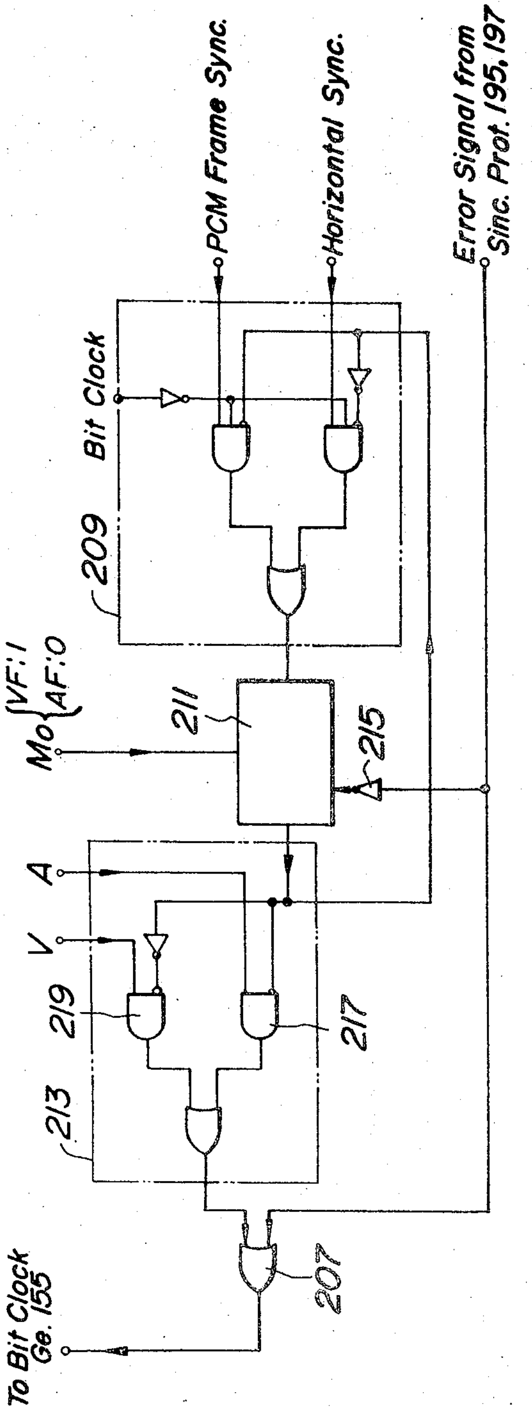
Figure 20:
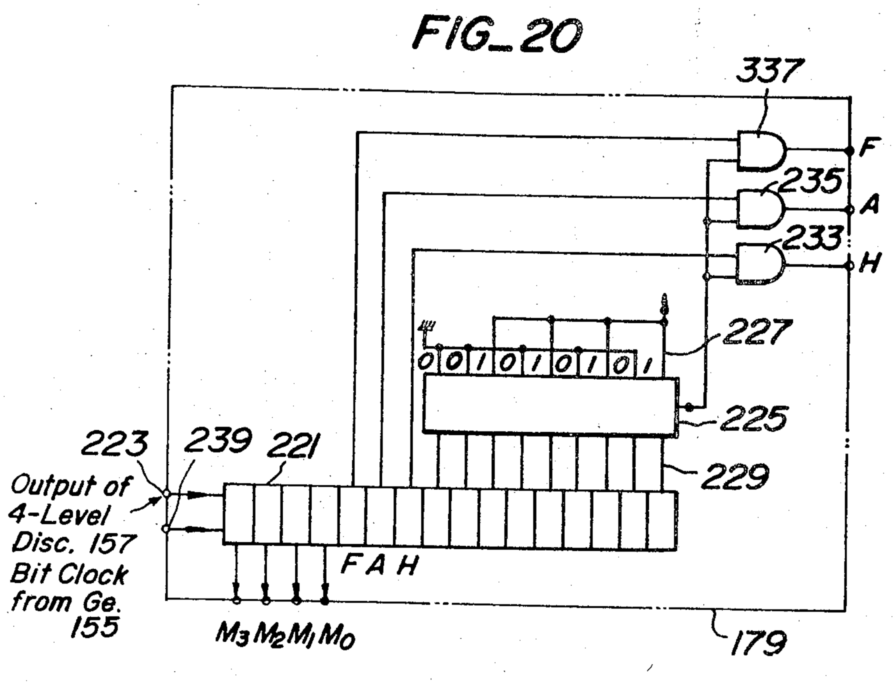
Figure 21:
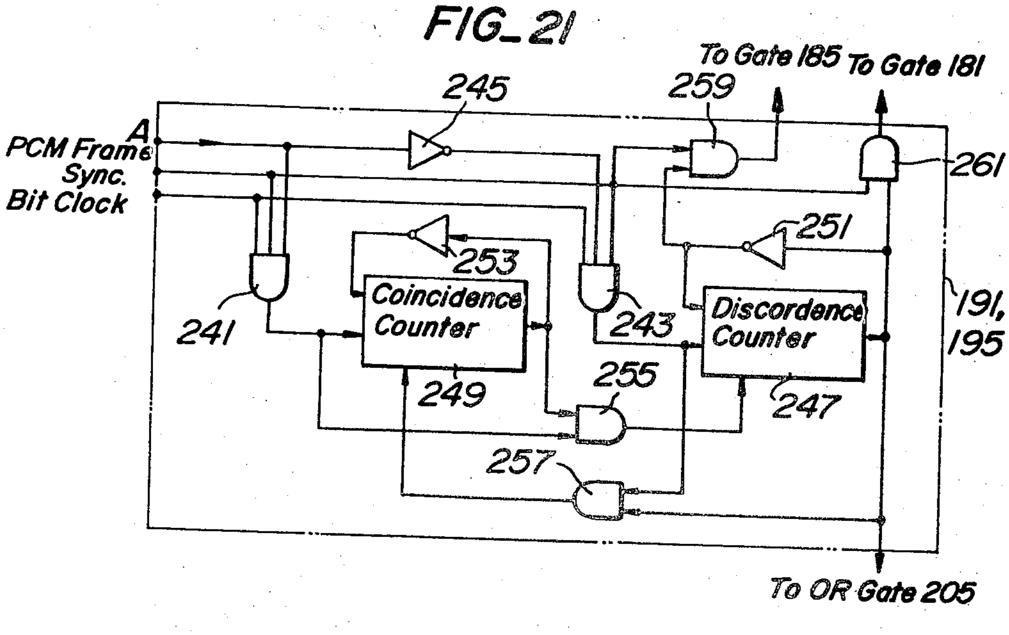
Figure 22:
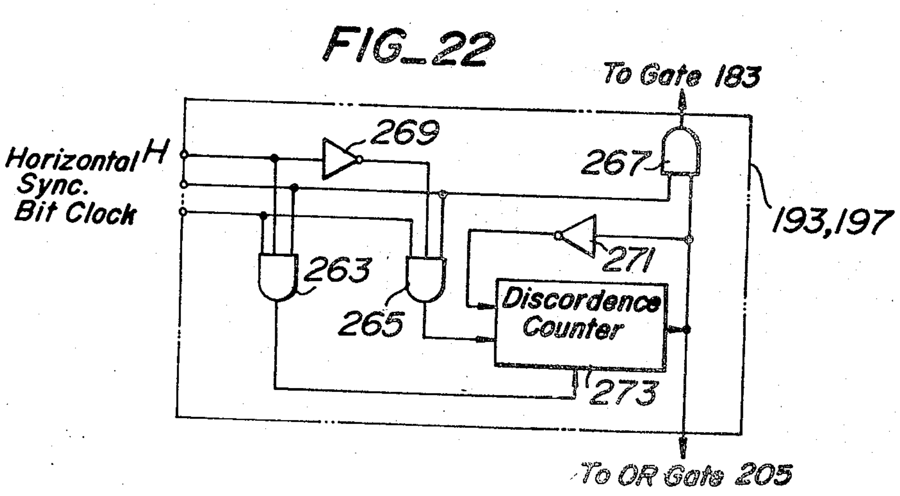
Figure 23:
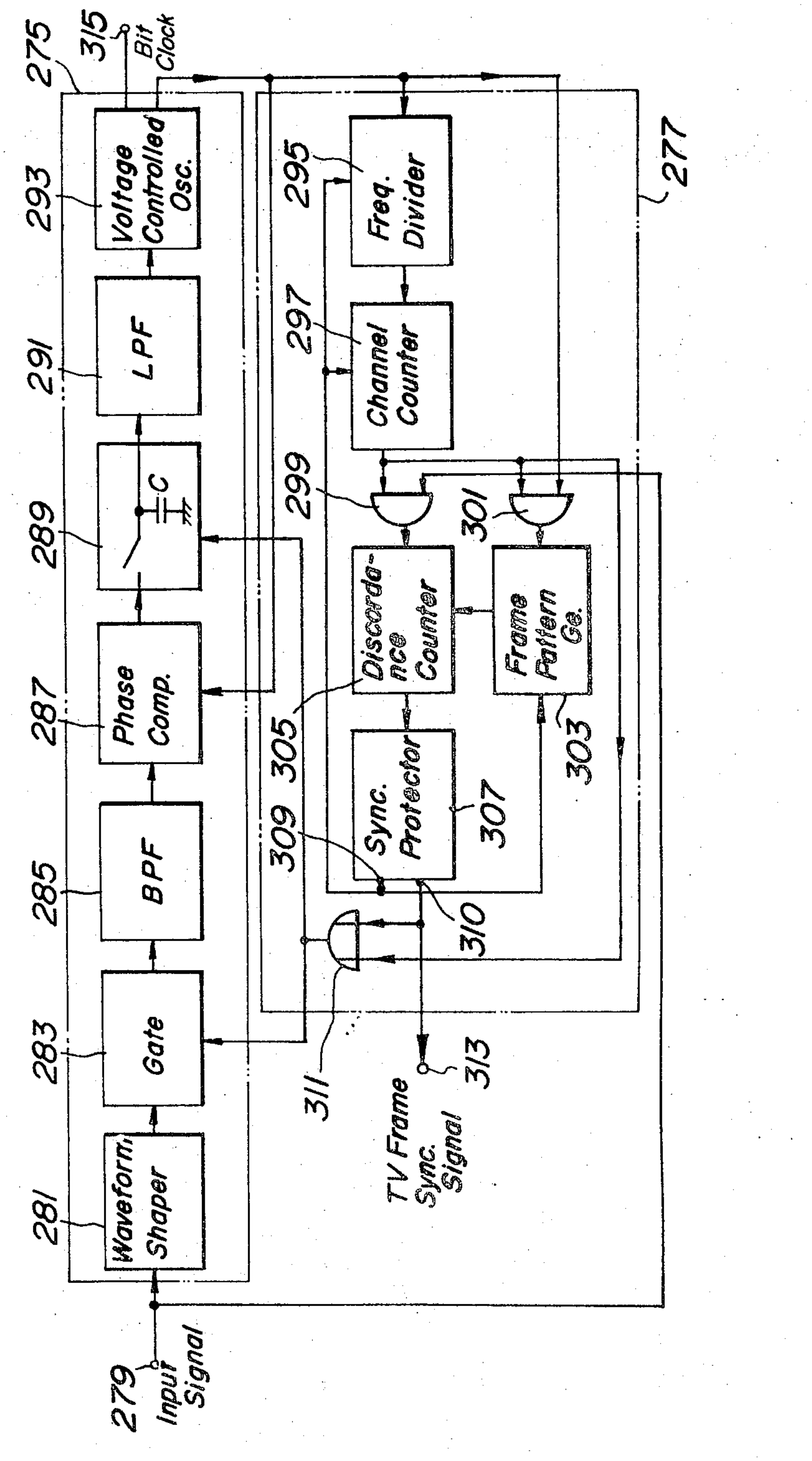
Figure 24:
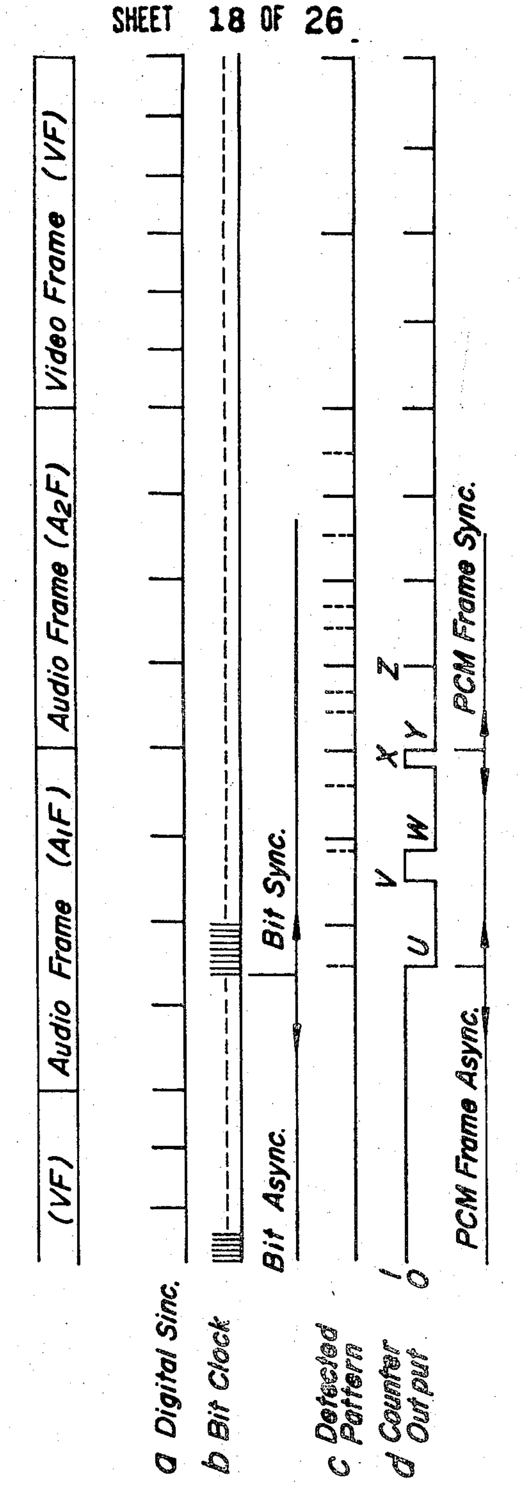
Figure 25:
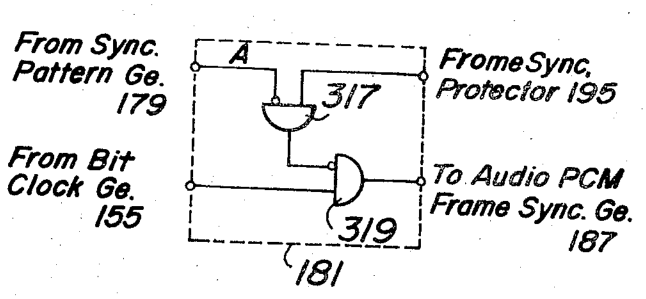
Figure 26:
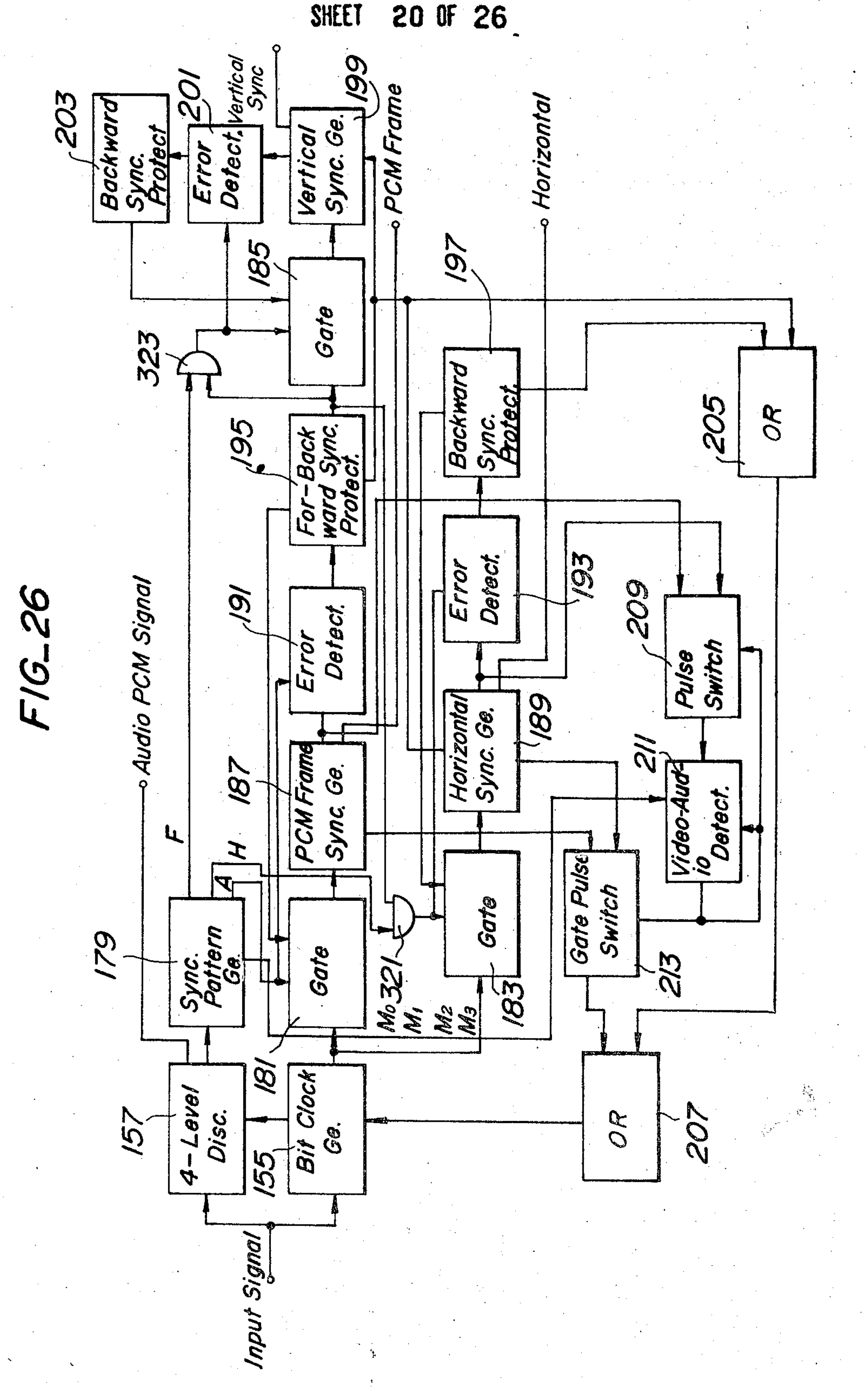
Figure 27:
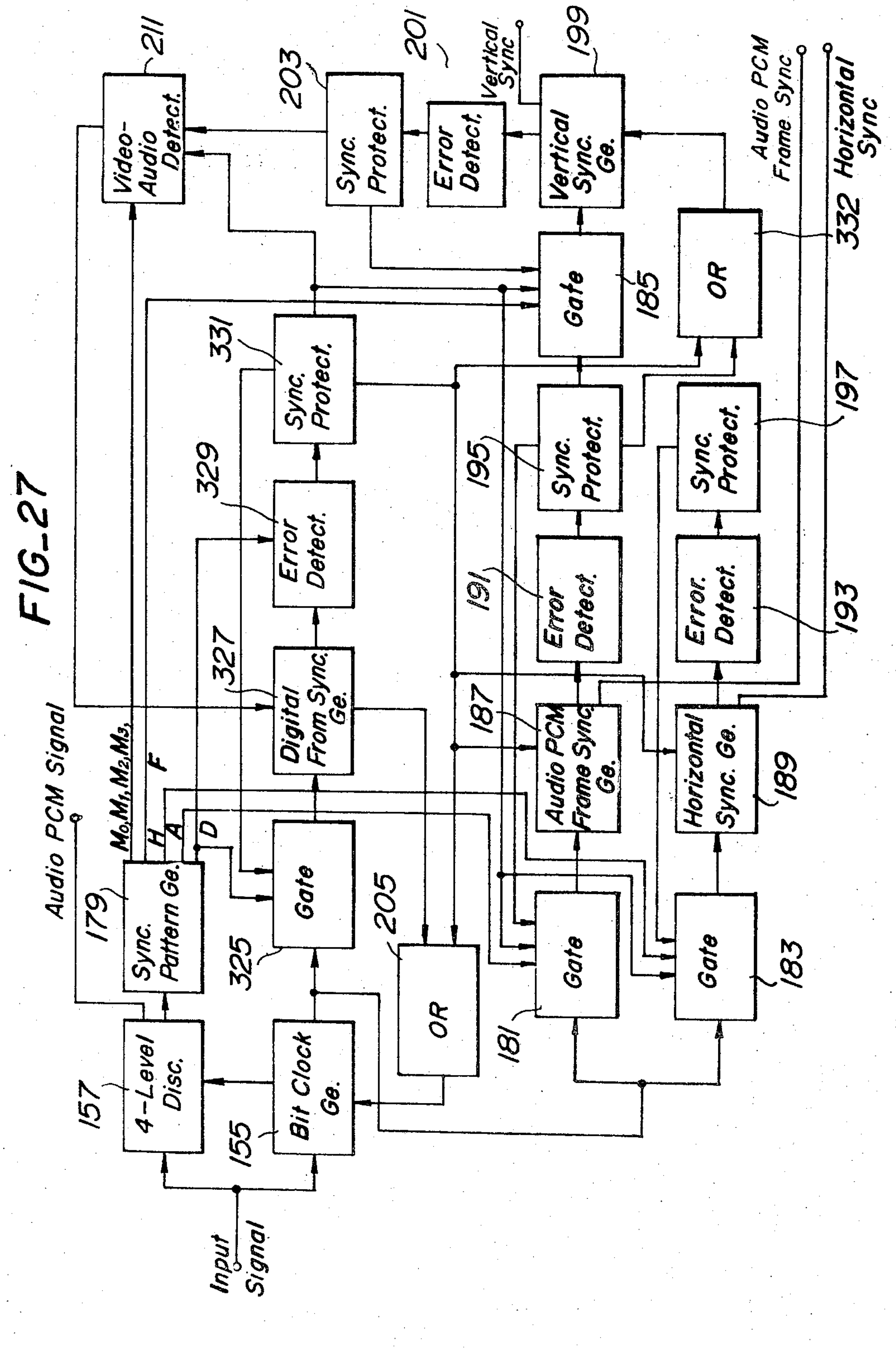
Figure 28:
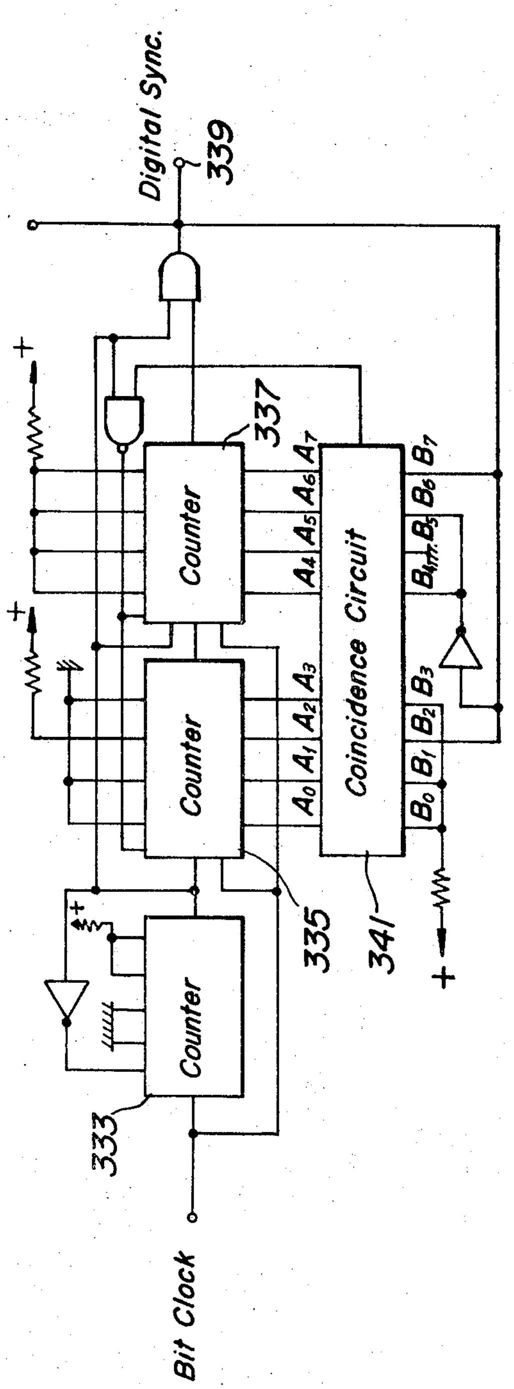
Figure 29:
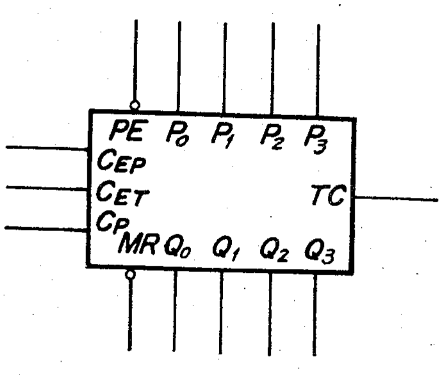
Figure 30:
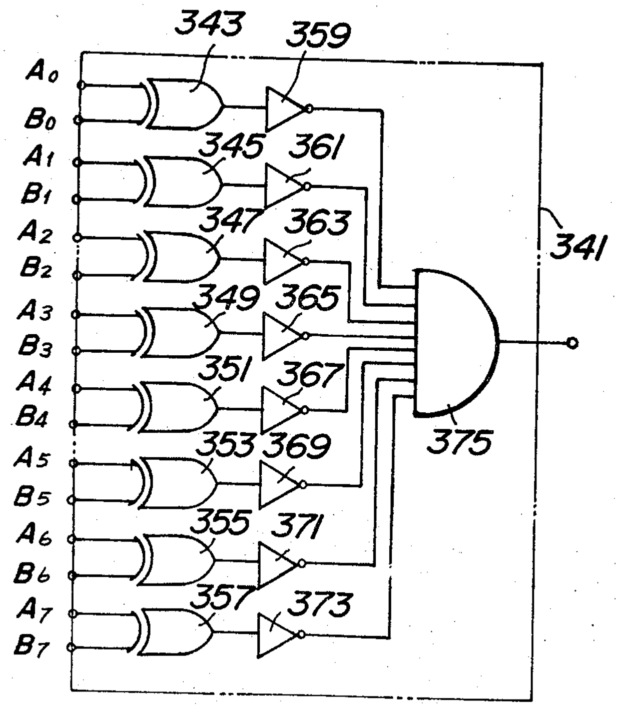
Figure 31:
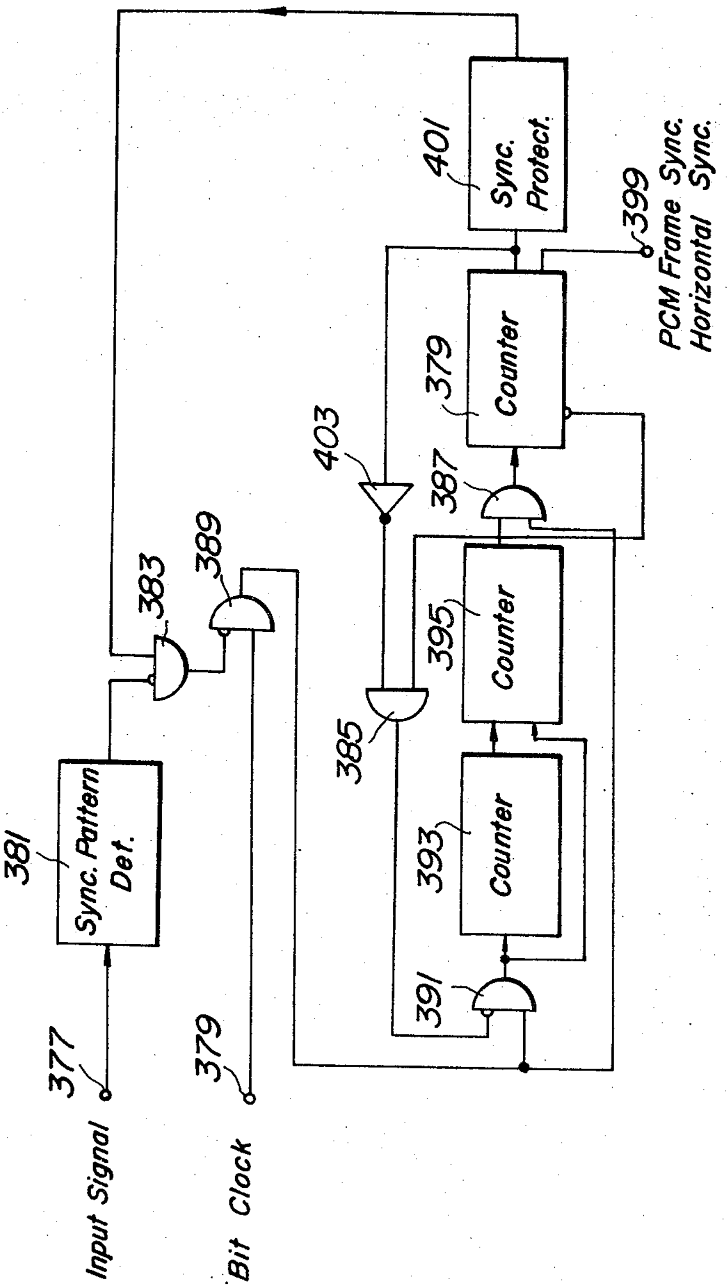

FIG. 6*a* illustrates a waveform of the transmitted signal in a video frame period and FIG. 6*b* shows a waveform of the transmitted signal in an audio frame period;

FIG. 7 depicts a waveform of a digital synchronizing signal consisted of a PCM frame synchronizing pattern and a mode control code;

FIG. 8*a* shows a portion of the video-audio signal, FIG. 8*b* a timing of transmission of the digital synchronizing signal, FIG. 8*c* imaginary position of the horizontal synchronizing signal, FIG. 8*d* a first code bit H in the mode control code, FIG. 8*e* imaginary positions of the PCM signal, FIG. 8*f* a second code bit A in the mode control code and FIG. 8*g* illustrates a third code bit F in the mode control code;

FIG. 9 is a block diagram showing an embodiment of a digital synchronizing signal generating device according to the invention;

FIG. 10 is a block diagram illustrating a detailed construction of a bit clock generator shown in FIG. 9;

FIG. 11 shows waveforms of various signals for explaining the operation of the digital synchronizing signal generating device shown in FIG. 9;

FIG. 12 illustrates a unit shift register from which a shift register shown in FIG. 9 is composed;

FIG. 13 shows the shift register constructed by the unit shift registers shown in FIG. 12;

FIG. 14 is a block diagram showing a detailed construction of a reset pulse generator shown in FIG. 9;

FIG. 15 illustrates waveforms for explaining the operation of the reset pulse generator illustrated in FIG. 14;

FIG. 16 is a block diagram showing a basic construction of a device at a receiver end for regenerating synchronizing signals;

FIG. 17 is a block diagram of an embodiment of a synchronizing signal regenerating circuit according to the invention;

FIG. 18 is a circuit diagram of an embodiment of a four-level discriminator shown in FIG. 17;

FIG. 19 is a block diagram of a portion of the circuit shown in FIG. 17;

FIG. 20 is a block diagram of a synchronizing pattern detector shown in FIG. 17;

FIG. 21 is a block diagram of an error detector and a forward and backward synchronization protector shown in FIG. 17;

FIG. 22 is a block diagram of an error detector and a backward synchronization protector shown in FIG. 17;

FIG. 23 is a block diagram showing a detailed construction of a bit clock generator shown in FIG. 17;

FIG. 24 shows waveforms for explaining the operation of the synchronizing signal generating circuit shown in FIG. 17;

FIG. 25 is a circuit diagram of a gate shown in FIG. 17;

FIG. 26 is a block diagram showing the construction of another embodiment of the synchronizing signal regenerating circuit according to the invention;

FIG. 27 is a block diagram showing the construction of still another embodiment of the synchronizing signal regenerating circuit according to the invention;

FIG. 28 is a block diagram illustrating the constuction of a counter of a digital frame synchronizing signal generator shown in FIG. 27;

FIG. 29 shows a logic symbol of a four-bit counter shown in FIG. 28;

FIG. 30 is a circuit diagram of a coincidence circuit shown in FIG. 29;

FIG. 31 is a block diagram illustrating the construction of a circuit for regenerating the audio PCM frame synchronizing signal or the video horizontal synchronizing signal according to the invention; and FIG. 32*a* and FIG. 32*b* illustrate another waveforms of the transmitted signal according to the invention in the video frame period and the audio frame period, respectively.

Figure 1:
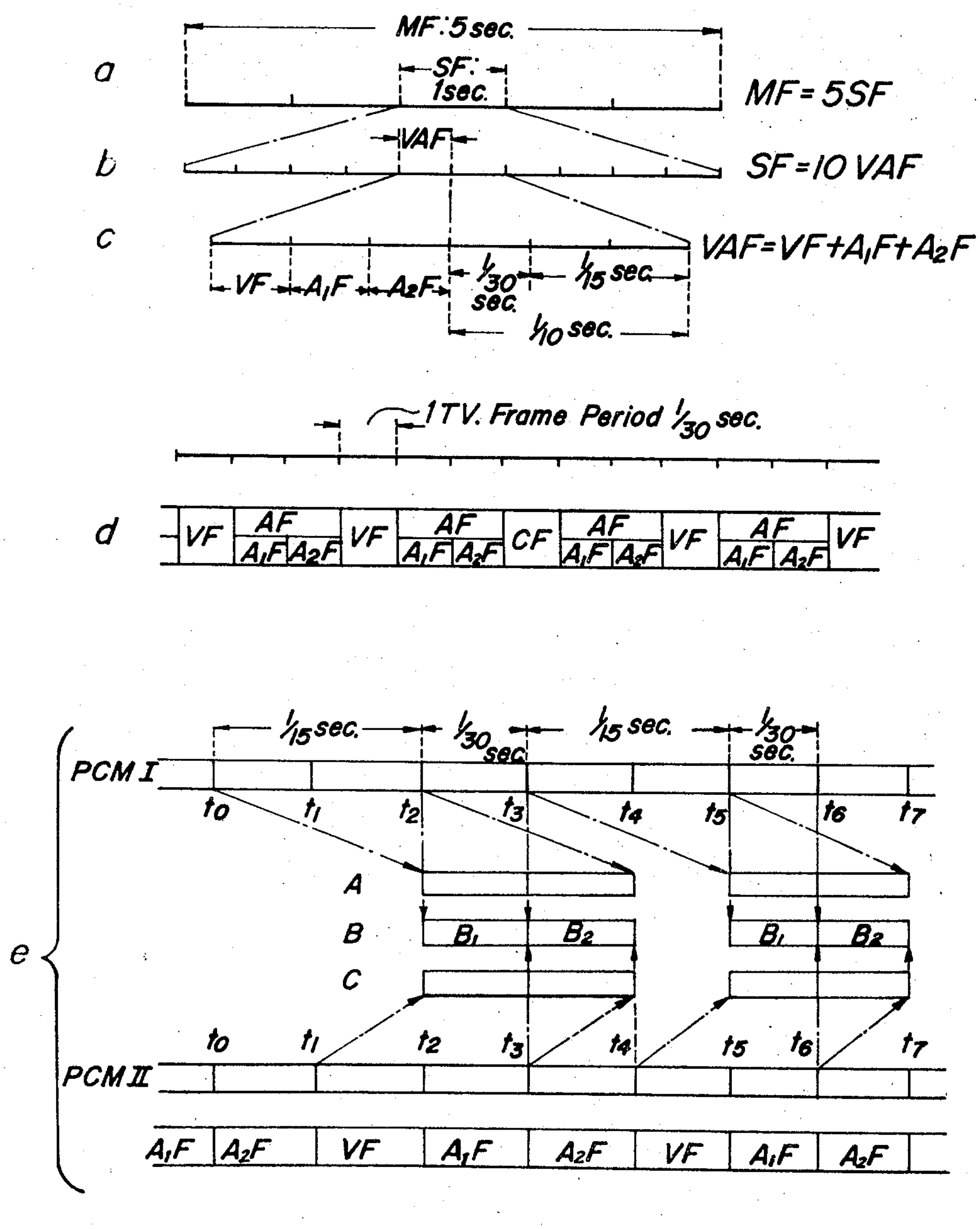

Now a basic construction of the transmitting system according to the invention will be firstly explained with reference to FIGS. 1 to 5. FIG. 1 shows a format of the video-audio multiplexed signal to be transmitted. FIG. 1*a* denotes a program of 5 seconds. The program is termed as a master frame MF. The master frame MF consists of five sub-frames SF, each of which has a duration of 1 second. As shown in FIG. 1*b*, each sub-frame SF consists of ten video-audio frames VAF and each video-audio frame VAF has a duration of one-tenth seconds. As illustrated in FIG. 1*c*, each video-audio frame VAF further consists of a video frame VF of one television frame period (one-thirtieth seconds) and an audio frame AF of two television frame period (one-fifteenth seconds). Each audio frame AF further consists of a first audio frame $A_1F$ and a second audio frame $A_2F$, each having one television frame period (one-thirtieth seconds). Thus the master frame MF is composed of a 150 television frames.

By constructing the master frame MF as mentioned above, in the master frame MF, there may be inserted 50 still pictures. However, in fact, it is necessary to transmit code signals for identifying still pictures and their related sounds and for indicating timings of starts and ends of various signals. It is advantageous to transmit such code signal in the video frames VF rather than in the audio frames AF. In the present embodiment, code signals are transmitted in a video frame VF of each sub-frame SF. A frame during which the code signals are transmitted is referred to as a code frame CF. FIG. 1*d* shows a part of the sub-frame SF which includes said code frame CF. Therefore, in the master frame MF, there are inserted 45 still pictures and thus it is required to transmit 45 sounds related thereto, i.e., 45 channels of audio-signals.

Sound like speech or music needs several seconds or more to give some meaning, because sound is inherently continuous. In the present embodiment an average duration of each sound relating to each still picture is limited to 10 seconds. As mentioned above the master frame MF has a duration of only 5 seconds, so that in order to transmit sounds of 10 seconds it is necessary to use the number of channels twice the number of sound channels. That is in order to transmit sounds of 45 channels relating to 45 still pictures, it is required to establish ninety audio channels. Moreover, it is impossible to transmit audio signals in the video frames VF. Therefore, PCM audio signals must be divided and allocated in the audio frames AF only. In order to effect such an allocation treatment for audio signals, the PCM audio signals of ninety channels are divided into two groups CPMI and PCMII as shown in FIG. 1*e*. Portions of PCMI corresponding to the second audio frames $A_2F$ and the video frames VF are delayed for two television frame period of one-fifteenth seconds and portions of PCMII corresponding to the video frames VF and the first audio frames $A_1F$ are delayed for one television frame period of one-thirtieth seconds. PCM signals thus delayed form audio channels A and C as illustrated in FIG. 1*e*. Portions of PCMI and PCMII which correspond to the first audio frames $A_1F$ and the second audio frames $A_2F$, respectively are directly inserted in audio channels $B_1$ and $B_2$ to form an audio channel B. In this manner in the audio channels A, B and C, there are formed vacant frames and these vacant frames correspond to the video frames VF. By effecting such an allocation for the audio signals, in each frame AF it is necessary to establish a number of audio channels which is one and half times of the number of the audio signal channels. In the present embodiment, a 135 audio channels have to be provided in each audio frame AF. In this manner, audio signals of a 135 channels are inserted in eachc audio frame AF in the form of PCM signals with being allocated in given time slots.

An embodiment of a transmitting apparatus for effecting the above mentioned still picture — PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and frequency-modulates a carrier by the video signal. FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radial direction above the surface of the disc memory 11. The disc memory 11 is preferably made of a plastic disc having coated a magnetic layer thereon. This kind of memory has been described in detail in an NHK Laboratories Note, Ser. No. 148, "Plated magnetic disc using plastic base"; December 1971. The disc 11 is rotatably driven by a motor 15 at a rate of 30 rounds per second. There is further provided an air-bearing type floating head 17 for reproducing video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensated video signal is supplied to a video input terminal of a video-audio multiplexer 27.

The audio signal processing system comprises an audio tape recorder 29 of remote controlled type. On this tape recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . 33-n. The amplified audio signals from the amplifiers 33-1, 33-2, 33-3 . . . 33-n are supplied to audio recording heads 35-1, 35-2, 35-3 . . . 35-n, respectively. There is provided an audio recording magnetic drum 37 which is rotated by a driving motor 39 at a rate of one revolution for 5 seconds. As already described above each sound corresponding to each still picture lasts for 10 seconds, so that each audio signal of each sound is recorded on two tracks of the magnetic drum 37 by means of each pair of audio recording heads 35-1, 35-2; 35-3, 35-4; . . . 35-n. That is a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2, . . . 35-n. In the present embodiment *n*=90.

The reproduced audio signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49 in which the PCM audio signal is allocated in the audio frames AF as explained above with reference to FIG. 1*e*. The detailed construction and operation of the audio allocation processor 47 will be explained later. The PCM audio signal supplied from the processor 49 is a two-level PCM signal. This two-level PCM signal is converted in a two-four level converter 51 in a four-level PCM signal. The four-level PCM audio signal is supplied to an audio signal input terminal of the video-audio multiplexer 27. In the multiplexer 27, the video signal from the time-error compensator 25 and the four-level PCM audio signal from the two-four converter 51 are multiplexed in a time division mode. A multiplexed video-audio signal from the multiplexer 27 is supplied to a code signal adder 53 which adds to the multiplexed video-audio signal the code signal for selecting desired still pictures and their related sounds at a receiver end to form the signal train shown in FIG. 1*d*. The signal train from the code signal adder 53 is further supplied to a synchronizing signal adder 55 in which a digital synchronizing signal is added to form an output video-audio signal to be transmitted.

Figure 2:
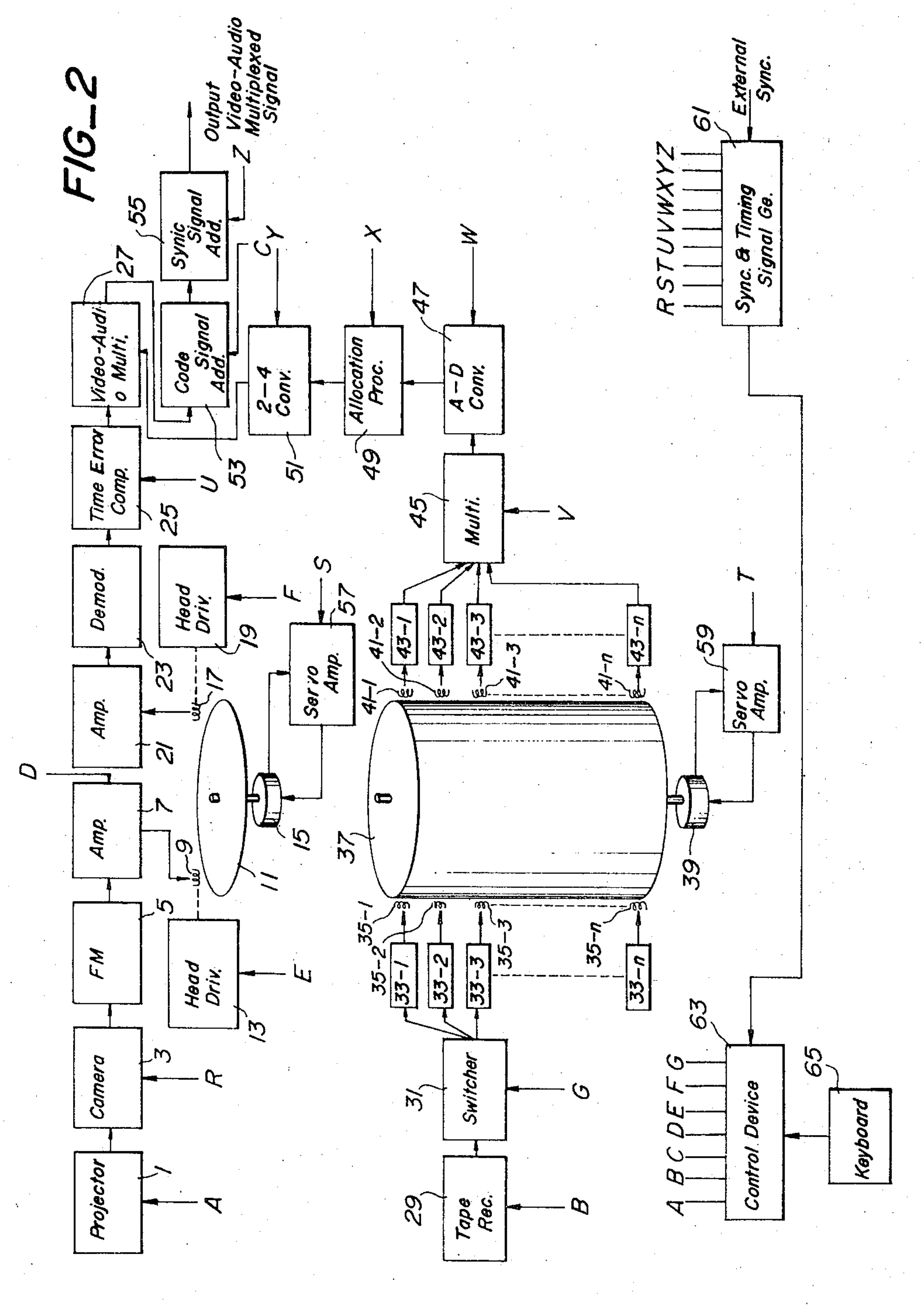
FIG. 2 illustrates diagrammatically a basic construction of an embodiment of a transmitter according to the invention.

In the transmitting apparatus shown in FIG. 2, there are further provided sero amplifiers 57 and 59 so as to maintain the rotation of the video disc memory 11 and the audio magnetic drum 37 to be constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of code signal, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

Figure 3:
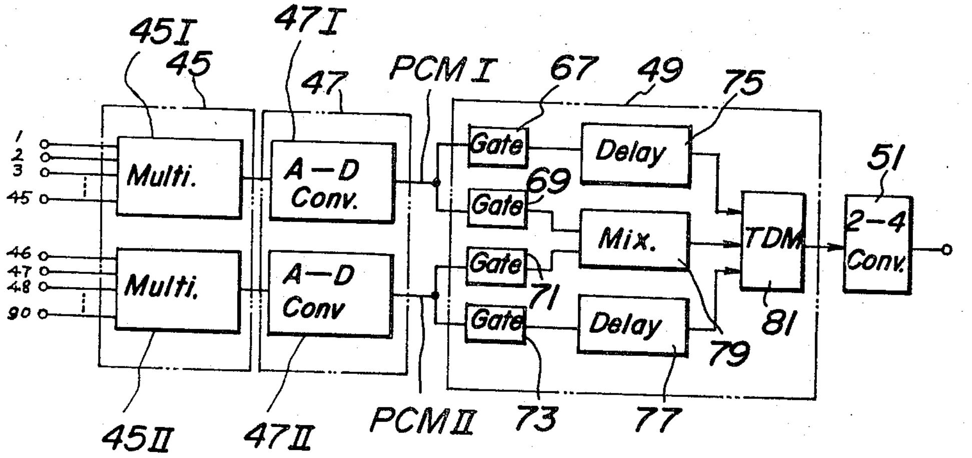
FIG. 3 is a block diagram showing a detailed construction of an audio allocation processor shown in FIG. 2.

FIG. 3 shows a detailed construction of the audio allocation processor 49. In FIG. 3, there are also shown the multiplexer 45, the A-D converter 47 and the two-four level converter 51. When independent audio signals of 90 channels are to be transmitted, they are divided into two groups each including 45 channels. These audio signals are supplied to a pair of multiplexers 45I and 45II and a pair of A-D converters 47I and 47II, respectively, to form a pair of PCM time division multiplexing signals PCMI and PCMII as shown in FIG. 1*e*.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal from the synchronizing and timing generator 61 shown in FIG. 2 that the gate 67 is opened for two frame periods $t_0$–$t_2$, $t_3$–$t_5$ . . . and closed for one frame period $t_2$–$t_3$, $t_5$–$t_6$ . . . in each three frame periods. To the gate 69 is applied a gate signal which has a reverse polarity as that of the gate signal supplied to the gate 67, so that the gate 69 is closed for two frame periods $t_0$–$t_2$, $t_3$–$t_5$ . . . and opened for one frame period $t_2$–$t_3$, $t_5$–$t_6$ . . . in each three frame periods. The gate 71 is opened for two frame periods $t_1$–$t_3$, $t_4$–$t_6$ . . . and closed for one frame period $t_0$–$t_1$, $t_3$–$t_4$ . . . in each three frame periods, but delayed for one frame period with respect to the gate 67. The gate 73 is closed for two frame periods $t_1$–$t_3$, $t_5$–$t_6$ . . . and opened for one frame period $t_0$–$t_1$, $t_3$–$t_4$ . . . in each three frame periods, but delayed for one frame period with respect to the gate 69. The construction and operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to form a time division multiplexed signal.

The signal PCMI is gated out by the gate 67 for a pariod $t_0$–$t_2$ and delayed by the delay circuit 75 for two frame periods to form the signal A shown in FIG. 1*e*. The other signal PCMII is gated out by the gate 73 for a period $t_1$–$t_3$ and delayed by the delay circuit 77 for one frame period to form the signal C shown in FIG. 1*e*. Moreover, a signal portion of the PCMI for a period $t_2$–$t_3$ is gated out by the gate 69 to form the signal $B_1$ shown in FIG. 1*e* and a signal portion of the PCMII for a period $t_3$–$t_4$ is gated out by the gate 71 to form the signal $B_2$ also shown in FIG. 1*e*. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the two-four level converter 51.

In the manner mentioned above, it is possible to form a vacant frame for a period of $t_1$–$t_2$ and the video signal can be transmitted in such a vacant frame.

In the transmitting apparatus mentioned above, the random access slide projector 1 is controlled by the control device 63 to project successive 45 still pictures and the video recording head 9 is driven by the mechanism 13 so as to face tracks of the disc memory 11. In this case, the video recording head 7 moves in one direction to face alternate 23 tracks so as to record 23 still pictures and then moves in an opposite direction to face remaining 22 tracks which situate between the tracks on which the video signals of first 23 still pictures have been recorded. The video recording amplifier 7 receives a gate signal D of one-thirtieth seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal s supplied from the generator 61. The video reproducing head 17 is driven by the mechanism 19 in the same manner as the video recording head 9. The reproducing head 17 is moved in the audio frame and code frame periods and is stopped in the video frame period to reproduce the video signal in a correct manner. The reproducing head 17 repeatedly reproduces the video signal of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T suppied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording a d.c. current is passed through the video recording head 9 and the previosuly recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Figure 4:
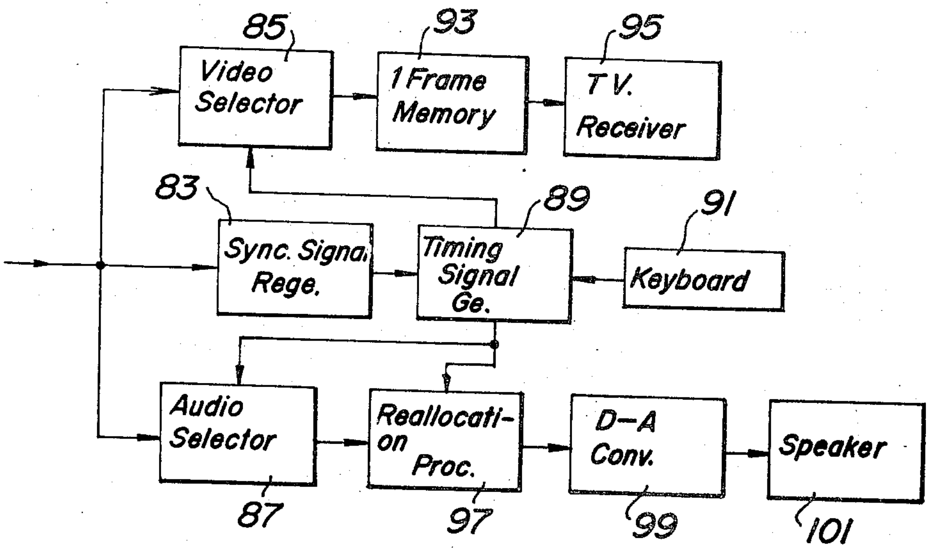
FIG. 4 is a block diagram showing a principle construction of a receiver according to the invention.

Next, a basic construction of a receiver will be expalined with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. To the timing signal generator 89 is also connected an instruction keyboard 91. The timing signal generator 89 produces timing signals to the video selector 85 and the audio selector 87 on the basis of the synchronizing signal from the regenerator 83 and the instruction from the keyboard 91. The video selector 85 selects a desired video signal and the audio selector 87 selects a desired audio signal related to the desired video signal. The selected video signal of the desired still picture is once stored in an one frame memory 93. The video signal of one frame period is repeatedly read out to form a continuous television video signal. The television video signal is displayed on a television receiver 95.

The selected audio PCM signal is supplied to an audio reallocation processor 99 to recover a continuous audio PCM signal. The audio PCM signal is supplied to a D-A converter 99 to form an analogue audio signal. This audio signal is reproduced by, for example, a loud speaker 101.

Figure 5:
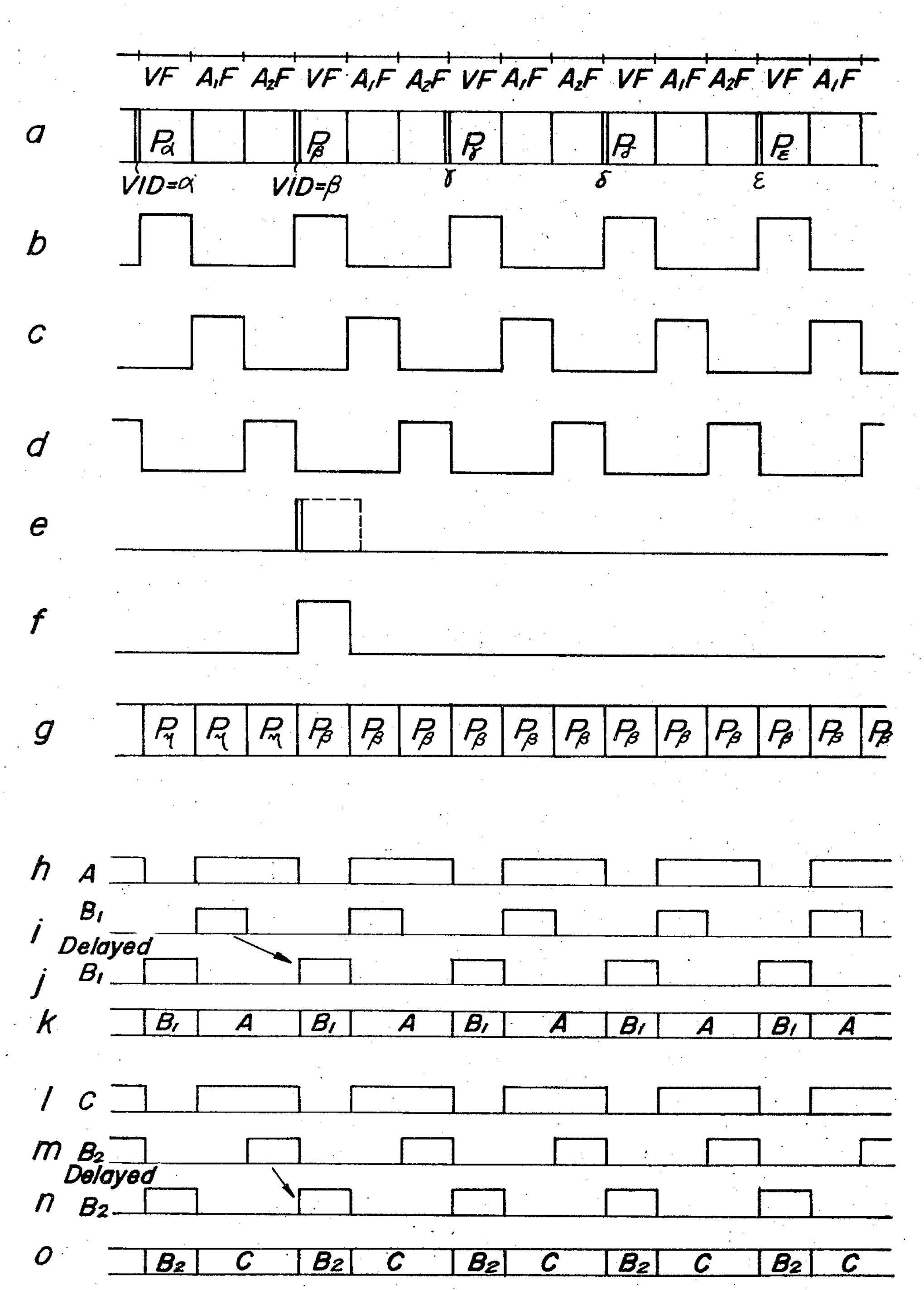
FIG. 5 shows waveforms for explaining the operation of the receiver shown in FIG. 4.

Now the operation of the receiver will be explained in detail with reference to FIG. 5 showing various waveforms.

In the synchronizing signal regenerator 83, PCM bit synchronizing signals and PCM frame synchronizing signals are reproduced in the manner which will be described later in detail and also gate signals shown in FIGS. 5*b*, *c* and *d*. The timing signal generator 89 detects a picture identification code VID which has been transmitted in a vertical flyback blanking period at a foremost portion of the picture transmission frame period VF. As shown in FIG. 5*a*, the picture identification code $\alpha$ for the picture $P\alpha$, the picture identification code $\beta$ for the picture $P\beta$ and so on are transmitted at the foremost portions of the picture transmission frame periods VF. The timing signal generator 89 compares the detected picture identification code VID with a desired picture number, for example, $\beta$ instructed by the keyboard 91. If they are identified to each other, the timing signal generator 89 produces a coincidence pulse shown in FIG. 5*e*. The coincidence pulse is prolonged by a monostable multivibrator circuit as shown by a dotted line in FIG. 5*e* and the prolonged pulse is gated out by the gate signal shown in FIG. 5*b* to form a video gate signal illustrated in FIG. 5*f*. The video gate signal is supplied to the video selector 85 to gate out the video signal $P\beta$ in a desired video frame and the video signal $P\beta$ thus selected is stored in the one frame memory 93. In the memory 93, the video signal $P\beta$ is repeatedly read out so that the continuous video signal shown in FIG. 5*g* is supplied to the television receiver 95. Thus the television receiver 95 displays the video signal $P\beta$ as a still picture instead of the picture $P\eta$ which has been displayed.

The audio signal is transmitted in the audio frame periods $A_1F$ and $A_2F$ in the form of PCM multiplexed signal. The timing signal for selecting desired PCM channels corresponding to the desired picture number, for example $\beta$ is generated by counting the above mentioned PCM bit synchronizing pulses and PCM frame synchronizing pulses. The timing signal thus generated is supplied to the audio selector 87 to select the desired PCM signal related to the selected still picture. FIG. 5*h* illustrates a pulse series of the audio channel A selected by the audio selector 87 and FIG. 5*i* shows a pulse series of the audio channel $B_1$ selected by the audio selector 87 and gated out by the gate signal shown in FIG. 5*c*. The audio reallocation processor 97 supplies the PCM pulse series shown in FIG. 5*h* directly to the D-A converter 99 and also supplies the PCM pulse series of FIG. 5*i* to the D-A converter 99, but after delaying by two television frame periods as shown in FIG. 5*j*. To this end, the timing signal from the generator 89 is supplied to the processor 97. The pulse series shown in FIGS. 5*h* and 5*j* are combined to form a continuous pulse series shown in FIG. 5*k*. The combined PCM signal is converted by the D-A converter 99 into the continuous analogue audio signal.

When the desired sound is transmitted in the channels C and $B_2$, the same operation as above will be carried out as shown in FIGS. 5*l*, *m*, *n* and *o* to form a desired continuous analogue audio signal. The picture number and the PCM channel number may be correlated to each other in such a manner that even number pictures correspond to the audio channels A and $B_1$ and odd number pictures correspond to the audio channels C and $B_2$.

In an embodiment which will be explained hereinafter an audio sampling frequency, i.e., an audio PCM frame synchronizing frequency is determined to two thirds of a video horizontal synchronizing frequency of 15.75 KHz. Thus the audio sampling frequency is equal to 10.5 KHz. The sampled audio signal is quantized by eight bits and then converted into four-level PCM signal and transmitted in 156 multiplex time slots with a bit frequency of about 6.54 MHz.

Figure 6:
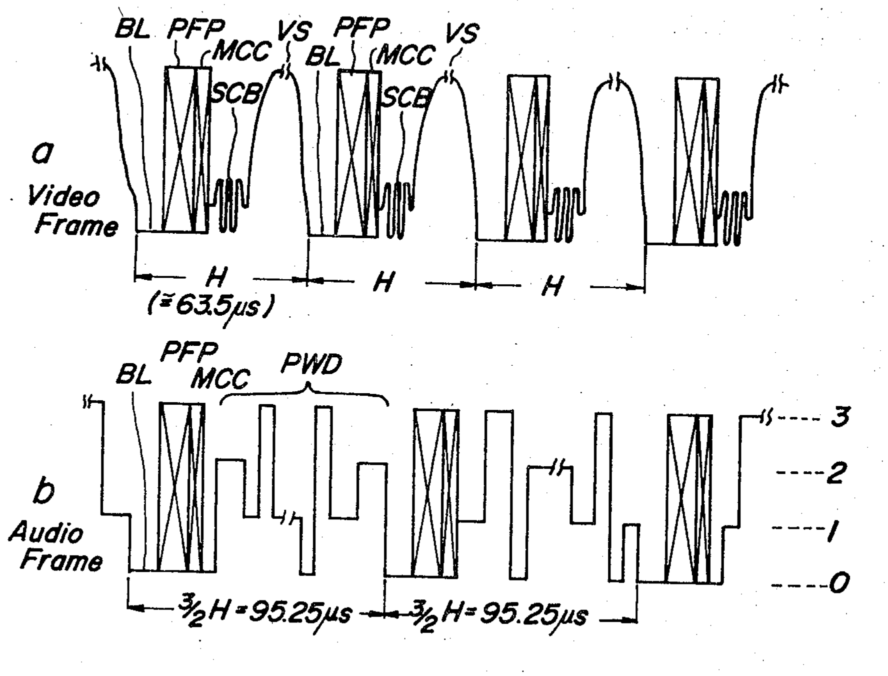

FIG. 6a shows a transmission signal in the still picture transmission period and FIG. 6b illustrates a transmission signal in the sound transmission period. In FIG. 6, a reference BL denotes a blanking pulse, PFP a PCM frame pattern, MCC a mode control code pattern, SCB a color sub-carrier burst signal, VS is a video signal and PWD indicates a four-level PCM audio signal. The PCM frame pattern PFP and the mode control code pattern MCC construct a digital synchronizing signal DS. In the picture transmission period the blanking pulse BL and the digital synchronizing signal DS are inserted at a position corresponding to a horizontal synchronizing signal at a rate of 63.5 $\mu s$ and in the sound transmission period are inserted at a rate of the sound sampling period of 95.25 $\mu s$.

FIG. 7 shows a detailed construction of the digital synchronizing signal DS composed of PFP and MCC. The digital synchronizing signal DS is inserted in both the picture and sound transmission periods as the same waveform. In other words the digital synchronizing signal DS has the common waveform for both the video and audio frame periods. The blanking pulse BL is formed by a signal free portion and is used to fix a level of the whole signal. The PCM frame pattern PFP constitutes a given pattern for the PCM frame synchronization of the audio signal and the horizontal synchronization of the video signal. The PCM frame pattern PFP also serves as a timing burst signal TBS for deriving a PCM bit synchronizing signal. For the timing burst signal TBS it is desired to construct the pattern PFP as a regular pattern such as 1010 . . . , but in the present embodiment use is made of a pattern having partially irregular portions such as 00101 . . . 0100, so as to be able to discriminate easily the PCM frame pattern PFP from similar patterns which might be occurred in the PCM audio signal. The mode control code MCC is a control signal for indicating positions of integer multiples of the horizontal synchronizing period of the video signal and the audio sampling period, positions of the television frame synchronizing signals and kinds of the transmitted signal, i.e., the video signal or the audio signal. As shown in FIG. 7, the mode control code MCC consists of eight code bits O, H, A, F, $M_0$, $M_1$, $M_2$ and $M_3$. The second code bit H indicates coincidence of the horizontal synchronizing signal and the digital synchronizing signal, the third code bit A coincidence of the sound sampling signal and the digital synchronizing signal, the fourth code bit F the television frame synchronizing signal and the remaining code bits $M_0$, $M_1$, $M_2$ and $M_3$ represent kinds of transmitted signal. The code bits $M_0$, $M_1$, $M_2$, $M_3$ become 1, 0, 0, 0 in the picture transmission period, 0, 1, 0, 0 in the first audio frame $A_1F$ and 0, 1, 1, 0 in the second audio frame $A_2F$.

FIG. 8a shows a portion of the still picture-sound multiplexed signal, FIG. 8b a timing of transmission of the digital synchronizing signal, FIG. 8c imaginary positions of the horizontal synchronizing signal, FIG. 8d the second code bit H in the mode control code MCC, FIG. 8e imaginary positions of the PCM frame synchronizing signal, FIG. 8f the third code bit A in the mode control code MCC and FIG. 8g illustrates the fourth code bit F in the mode control code MCC. The second code bit H is at a logic level 1 when a timing of the digital synchronizing signal DC coincides with that of the horizontal synchronizing signal and is a logic level 0 when a transmission timing of these synchronizing signals does not coincide with each other. Thus as shown in FIG. 8d, in the picture transmission period, i.e., in the video frame VF the code bit H is always at a logic level 1, but in the sound transmission periods, i.e., in the audio frame AF, alternate mode control codes MCC correspond to positions of the horizontal synchronizing signals as shown in FIG. 8b and c, so that alternate code bits H become a logic level 1 as illustrated in FIG. 8d.

The third code bit A in the mode control code MCC is at a logic level 1 when a timing of the sound sampling signal coincides with the digital synchronizing signal DS and is at a logic level 0 when they do not coincide with each other. Therefore, in the sound transmission period, the third code bit A is always at a logic level 1, but in the picture transmission period becomes a logic level 1 once for each three audio sampling periods as shown in FIG. 8f.

The above mentioned digital synchronizing signal DS is generated by the synchronizing and timing signal generator 61 shown in FIG. 2. FIG. 9 shows an embodiment of a device for generating the digital synchronizing signal DS, which device forms a part of the synchronizing and timing signal generator 61. The device comprises a synchronizing signal generator 103 which is the same as that used in an ordinary television apparatus and produces a vertical driving signal VD, a horizontal driving signal HD and a color sub-carrier SC. The television camera 3 shown in FIG. 2 is driven by these signals. As a case may be, the synchronizing signal generator 103 may be locked with an external synchronizing signal or a video and synchronizing composite signal supplied to an input terminal 105. The horizontal and vertical driving signals HD and VD are supplied to a reset pulse generator 107. The reset pulse generator 107 produces reset pulses for counters 111, 113 and 115 at a starting instance of the video frame VF so that a phase of the synchronizing signal of the video signal coincides with that of the digital synchronizing signal DS. By this measure the synchronizing signal of the video signal is phase-locked with the digital synchronizing signal, and as the result thereof the video signal and the audio PCM signal can be transmitted in a time division multiplexing mode as shown in FIG. 1d. The device shown in FIG. 9 further comprises a bit clock generator 109 which receives the color sub-carrier SC from the synchronizing signal generator 103 and produces bit clocks of 6.54 MHz corresponding to sixty-four thirty-fifths times of the color sub-carrier frequency of 3.58 MHz.

FIG. 10 illustrates a detailed construction of the bit clock generator 109. The bit clock generator 109 comprises a counter 117 which counts down the color sub-carrier SC of 3.579545 MHz by one thirty-fifth, a phase comparator 119 which compares a phase of the output from the counter 117 with that of an output from a counter 121 and a voltage controlled oscillator 123 which produces a signal of 6.545454 MHz, a phase of said signal being controlled by a comparison output voltage from said phase comparator 119. The counter 121 is inserted in an automatic phase control loop from the oscillator 123 to the phase comparator 119 and counts down the output signal of 6.545454 MHz from the oscillator 123 by one sixty-fourth. In the bit clock generator 109 having the above mentioned construction a phase of the signal obtained by counting down the color sub-carrier SC of 3.579545 MHz from the synchronizing signal generator 103 is compared with that of the output signal of 6.545454 MHz from the voltage controlled oscillator 123 so as to control a phase of the output signal from the oscillator 123, so that the bit clocks having a frequency equal to sixty-four thirty-fifths times of the color sub-carrier frequency are generated with having a given phase relation with respect to the color sub-carrier. The bit clocks are illustrated in FIG. 11*b*. FIG. 11*a* shows a portion of the video and audio PCM multiplexed signal.

In FIG. 9, the bit clocks *b* from the bit clock generator 109 are supplied to the counter 111 which counts down the bit clocks by one-eighth to produce a signal *c* shown in FIG. 11*c* having a time slot frequency of 0.81 MHz for the PCM-TDM signal. The output signal *c* from the counter 111 is further supplied to the counter 113 which counts down the signal *c* by one seventy-eighth to produce a signal *d* shown in FIG. 11*d* having the sound sampling frequency of 10.489 KHz. The output signal *d* from the counter 113 is further supplied to the counter 115 which counts down the signal *d* by one three-hundred-fiftieth to produce a signal *f* shown in FIG. 11*f* having the television frame frequency of 30 Hz. The output signal *f* from the counter 115 is further supplied to a counter 125 which counts down the signal *f* by one-third to produce a signal *i* shown in FIG. 11*i* of the video-audio frame frequency of 10 Hz. The output signal *c* from the counter 111 is further supplied to a counter 127 which counts down the signal *c* by one fifty-second to generate a signal *e* of the horizontal synchronizing signal frequency of 15.734 KHz shown in FIG. 11*e*. The counter 127 is reset by the output signal from the counter 115 at a rate of one-thirtieth seconds so as to maintain a given phase relation between the output signals *d*, *f*, and *e* from the counters 113, 115 and 127 as shown in FIG. 11*d*, *f* and *e*.

The counter 125 is consisted of three stage flip-flops and produces an output signal *g* corresponding to a first bit shown in FIG. 11*g* from the first stage and also an output signal *h* corresponding to a second bit shown in FIG. 11*h*. As shown in FIG. 11*g* and *h*, the signal *g* is at a logic level 1 during the first audio period $A_1F$ and the signal *h* is at a logic level 1 during the second audio frame $A_2F$. These output signals *g* and *h* are supplied to an OR gate to form a logical sum signal *i* shown in FIG. 11*i*, which signal *i* is at a logic level 1 during the audio frame period.

In FIG. 9, the output signal *d* of the sound sampling frequency from the counter 113 and the output signal *i* of 10 Hz from the counter 125 are supplied to an AND gate 129. Thus the gate 129 passes the sound sampling signal *d* during only the audio frame period. The output signal *i* from the counter 125 and the output signal *e* from the counter 127 are supplied to an inhibition gate 131 which passes the horizontal synchronizing signal *e* of 15.734 KHz only when the signal *i* from the counter 125 is at a negative level. The output signals from the AND gate 129 and the inhibition gate 131 are supplied to a NOR gate 133 which makes a logical sum signal *j* of these signals in the reverse polarity and supplies the signal *j* to a parallel enable input $\overline{PE}$ of a shift register 135.

FIG. 12 illustrates a unit shift register 137 from which the shift register 135 is composed. The shift register unit 137 comprises four parallel input terminals $P_0$, $P_1$, $P_2$ and $P_3$, a parallel enable terminal $\overline{PE}$, a clock pulse input terminal CP, series input terminals J and $\overline{K}$, a reset terminal R, parallel output terminals $Q_0$, $Q_1$ and $Q_2$, and a series output terminal $Q_3$. Such a shift register unit 137 is available from FAIRCHILD Company under a trade name of "MEDIUM SCALE INTEGRATION 9300." The shift register 135 is constructed by connecting six of such shift register units 137-1, 137-2 . . . 137-6 in series as shown in FIG. 13. Thus twenty four input bits can be applied to the shift register 135 in parallel. By means of the shift register 135 the digital synchronizing signal DS of 24 bits shown in FIG. 7 is formed.

As already explained above, in the digital synchronizing signal DS, 16 bits for the PCM framing pattern PFP and a first bit of the mode control code MCC constitute a fixed pattern. Therefore, parallel input terminals corresponding to first 17 bits are previously set as shown in FIG. 9. This set operation is effected in such a manner that input terminals corresponding to 1 are connected to a given supply voltage source and those corresponding to 0 are connected to the earth. To an eighteenth parallel input terminal corresponding to the code bit H is supplied the horizontal synchronizing signal *e* from the counter 127. To a nineteenth parallel input terminal corresponding to the second code bit A is supplied the sound sampling signal *d*, that is the audio PCM frame synchronizing signal *d* from the counter 113. The television frame synchronizing signal *f*, i.e., the vertical synchronizing signal *f* from the counter 115 is supplied to a twentieth parallel input terminal corresponding to the third code bit F. As explained above, the remaining four bits $M_0$, $M_1$, $M_2$ and $M_3$ of the mode control code MCC are 1, 0, 0, 0 in the picture transmission period, 0, 1, 0, 0 in the first audio frame period and 0, 1, 1, 0 in the second audio frame period. For this purpose to a twenty first parallel input terminal corresponding to the code bit $M_0$ is supplied the output signal *i* from the counter 125 with its polarity being reversed, to a twenty-second parallel input corresponding to the code bit $M_1$ is directly supplied the output signal *i* from the counter 125 and to a twenty-third parallel input corresponding to the code bit $M_2$ is supplied the output signal *h* from the second stage of the counter 125. To a twenty-fourth parallel input corresponding to the code bit $M_3$ is always applied the earth potential.

As already described above, to the parallel enable input $\overline{PE}$ of the shift register 135 is supplied the output signal *j* from the NOR gate 133. The input signals supplied to the parallel input terminals of the shift register 135 are written in the register when an amplitude of the signal *j* is zero, that is there exists the PCM frame synchronizing signal $d$ from the counter 113 or the horizontal synchronizing signal of the video signal $e$ from the counter 127. The content of the shift register 135 is successively read out to a series output terminal $Q_3$ by the bit clocks supplied to the clock pulse input terminals CP during a time period in which the signal $j$ supplied to the parallel enable input terminal $\overline{PE}$ is at a high level, that is there is existed neither the PCM frame synchronizing signal $d$ nor the horizontal synchronizing signal $e$. In this manner, the output signal from the series output terminal $Q_3$ has the waveform shown in FIG. 7.

FIG. 14 shows a detailed construction of the reset pulse generator 107 shown in FIG. 9 and FIG. 15 illustrates waveforms for explaining the operation of the generator 107. In FIG. 14 the reset pulse generator 107 comprises a monostable multivibrator 139 which receives from the synchronizing signal generator 103 shown in FIG. 9 the vertical driving signal VD of a negative polarity and having a duration of nine horizontal scanning periods 9H (H=63.5 $\mu$ seconds). The vertical driving signal VD is illustrated in FIG. 15*a*. The monostable multivibrator 139 produces a pulse having a duration of 0.5H from an instance of a negative going edge of the vertical driving pulse VD. The pulse produced from the multivibrator 139 is depicted in FIG. 15*c*. The vertical driving pulse VD on the left hand side in FIG. 15*a* is inserted in an odd field and coincides with the horizontal driving signal HD shown in FIG. 15*b*. But the vertical driving pulse VD on the right hand side of FIG. 15*a* is of an even field and deviates from the horizontal synchronizing signal HD by 0.5H. By utilizing such a fact it is possible to detect a first horizontal driving signal HD in the odd field. To this end the horizontal driving signal HD is supplied to one input of an AND gate 141 through an inverter 142 and to the other input of the AND gate 141 is supplied the output signal from the multivibrator 139. The AND gate 141 gates out a first horizontal driving pulse HD of the odd field as shown in FIG. 15*d*. The horizontal driving signal HD thus gated out is supplied to a two bit shift register 143. The shift register 143 may be, for instance, constructed by using two bits of the medium scale integration 9300 of FAIRCHILD Company shown in FIG. 12 and thus only the parallel output terminals $Q_0$ and $Q_1$ are used. In case of using such a shift register the horizontal driving signal HD gated out by the AND gate 141 is supplied to commonly connected series input terminals J and $\overline{K}$ and written in the shift register. Just after the horizontal driving pulse HD has been written in the register, a parallel output terminal $Q_0$ becomes 1 and a parallel output terminal $Q_1$ becomes 0. Thus, by detecting an output from the output terminal $Q_1$, it is possible to derive a reset pulse having a duration of one bit interval at the starting portion of each video frame of the television signal. The shift register 143 has a clock pulse input terminal CP and to this terminal CP are supplied the bit clocks from one bit clock generator 109 as shown in FIG. 9. The signal applied to the input terminals J and $\overline{K}$ is written in the register by the clock pulses. If the signal to the input terminals J and $\overline{K}$ is 1 at an occurrence of a first clock pulse, an output from the terminal $Q_0$ is 1 and that from the terminal $Q_1$ is 0. If the signal to the input terminals J and $\overline{K}$ is still 1 when a next clock pulse is applied, both outputs from both output terminals $Q_0$ and $Q_1$ are 1. A polarity of the output pulse from the second bit output terminal $Q_1$ of the shift register 143 is inverted by an inverter 145 and then supplied to one input of an AND gate 147. To the other input of the AND gate 147 is supplied the output pulse from the first bit output terminal $Q_0$ of the shift register 143. In this manner from the output of the AND gate 147 is produced a reset pulse shown in FIG. 15*g*. FIG. 15*f* illustrates the bit clocks supplied from the bit clock generator 109. In FIGS. 15*e*, *f* and *g*, the signal waveforms are illustrated with a time axis being extremely prolonged.

The digital synchronizing signal generating device according to the invention operates as follows. The color sub-carrier SC generated from the synchronizing signal generator 103 is supplied to the bit clock generator 109 which produces the bit clocks $b$ shown in FIG. 11*b* having the frequency equal to sixty-four thirty-fifths times of the color sub-carrier frequency. This bit clocks $b$ are counted down in the counter 111 by one-eighth to form the time slot signal $c$ of the PCM-TDM signal shown in FIG. 11*c*. This time slot signal $c$ is further counted down in the counter 113 by one seventy-eighth to produce the sound sampling signal $d$ shown in FIG. 11*d*. The sound sampling signal $d$ is supplied to the counter 115 and is counted down by one three-hundred-fiftieth to form the television frame synchronizing signal $f$ shown in FIG. 11*f*. This signal $f$ is further counted down in the counter 125 by one-third to produce the video-audio frame synchronizing signal $i$ shown in FIG. 11*i*. The time slot signal $c$ is further supplied to the counter 127 and is counted down by one fifty-second to form the horizontal synchronizing signal $e$ of the video signal shown in FIG. 11*e*. The counters 111, 113 and 115 are reset by the reset pulse shown in FIG. 15*g* supplied from the reset pulse generator 107 which is driven by the horizontal driving signal HD and the vertical driving signal VD supplied from the synchronizing signal generator 103, so that a phase of a count start point for generating the sound sampling signal $d$ coincides with that of the frame of the video-signal and a phase of the television frame synchronizing signal $f$ coincides with that of the frame of the video signal. Moreover, the counter 127 is reset by the signal of the television frame frequency from the counter 115 and as the result thereof a phase of a count start point for producing the television horizontal synchronizing signal $e$ corresponds to a phase of the frame of the video signal. Therefore there is established a given phase relation between the synchronizing signals for the video signal and audio PCM signal and the video signal and audio PCM signal can be transmitted in a time division mode. That is, in one video-audio frame VAF timings of starting points of the video frame signal, the audio PCM frame signal, the video horizontal synchronizing signal, the PCM time slot signal and the bit clocks coincide with one another and every other audio PCM frame pulses correspond in their timings of occurrence to every three horizontal synchronizing signals as shown in FIGS. 11*d* and *e*.

Right hand portions of FIG. 11 show signal waveforms at a first portion of the first audio PCM period $A_1F$. As shown in FIG. 11*b*, if it is assumed that positive going edges of the bit clocks $b$ occur at timings of $t_1$, $t_2$, $t_3$ . . . , positive or negative going edges of the output signal $c$, $d$, $f$, $i$ and $e$ from the counters 111, 113, 115, 125 and 127 delay by $tpd_1$ or $tpd_2$ with respect to the timings $t_1$, $t_2$, $t_3$ . . . At a timing $t_1$ of a positive going edge of a bit clock $b$ the signal $j$ supplied to the parallel enable input terminal $\overline{PE}$ of the shift register 135 has a logical level 1, so that the various signals supplied to the parallel input terminals of the shift register 135 are not written in the shift register 135. But at a timing $t_2$ of a positive going edge of a next bit clock, the signal $j$ supplied to the terminal $\overline{PE}$ has been changed to a logical level 0 and at that instance the signal $f$, $i$, $d$ and/or $e$ are at a logical level 1, so that 1 is written in the shift register 135 corresponding to the code bits H and/or A and F.

At a timing $t_3$ of a positive going edge of a next bit clock the signal $j$ supplied to the terminal $\overline{PE}$ has been returned to a logical level 1, so that the data written in the shift register 135 at the timing $t_2$ is shifted by one bit. After that the content in the shift register 135 is shifted one bit by one bit each time when the bit clock is supplied to the input terminal CP and successive bits of the output signal are supplied from the output terminal $Q_3$ of the shift register 135.

In the video frame period VF, a timing that the signal $j$ supplied to the terminal $\overline{PE}$ of the shift register 135 becomes 0 coincides with a timing that the output signal $e$ from the counter 127 becomes 1, but a timing of the output signal $d$ from the counter 113 coincides with that of the signal $j$ at a rate of three to one. Thus in the video frame period the bit H of the digital synchronizing signal DS is always 1, but the bit A is 1 once for each three digital synchronizing signal DS. In the similar manner, in the audio frame period the bit A is always 1, but the bit H becomes 1 in alternate digital synchronizing signals DS.

In the embodiment explained so far the audio PCM frame frequency, i.e., the sound sampling frequency (referred to as $f_{sa}$) is equal to two thirds of the horizontal scanning frequency (referred to as $f_h$) of the video signal, that is $f_{sa}=2/3\, f_h$. Next a feature that what frequency relation can be established in general for carrying out the present invention will be explained.

The pulse transmission frequency, i.e., the bit clock frequency $f_p$, the audio PCM frame frequency $f_{sa}$ and the number X of the time division multiplexing of the audio channels in the audio PCM signal are important factors for establishing the transmission system. Now a method for determining these factors will be described. In usual PCM transmission the parameters $f_p$, $f_{sa}$ and X are determined by requirements on a transmission quality of sounds and a transmission bandwidth of a transmission line. In the present invention, the following conditions (1), (2) and (3) should be satisfied in order to establish easily the synchronization of pictures and sounds and to reproduce still pictures and sounds completely at a receiver end.

1. The pulse transmission frequency $f_p$ should be integer multiples of the horizontal scanning frequency $f_h$ in the video frame period and the audio PCM frame frequency $f_{sa}$. That is the following equation (1) should be satisfied;

$$f_p = If_h = Jf_{sa} \qquad (1)$$

wherein $I$ and $J$ are positive integers.

2. In order to make the audio PCM frame synchronizing signal continuous in both the video frame and the audio frame periods, it is necessary to complete the audio PCM frame in a time period of one television frame. The number R of the audio PCM frames contained in one television frame period is expressed by the following equation (2);

$$R = K{\cdot}f_{sa}/f_h = K{\cdot}M/N \qquad (2)$$

wherein $K$ is the number of the horizontal scanning lines in one television frame and $K$, $M$, $N$ and $R$ are positive integers.

3. The condition explained in the above item (2) is also a condition for making the horizontal synchronizing signal continuous in the video and audio frame periods. In general, the color sub-carrier frequency $f_{sc}$ has a given relation expressed by the following equation (3) with respect to the horizontal scanning frequency $f_h$;

$$f_{sc} = T/S \cdot f_h \qquad (3)$$

wherein $S$ and $T$ are positive integers. From the equations (1) and (3), the following equations (4) and (5) can be derived;

$$I = f_p/f_h = T{\cdot}f_p/S{\cdot}f_{sc} = T/S \cdot Q/P \qquad (4)$$

$$J = f_p/f_{sa} = I{\cdot}f_h/f_{sa} = T{\cdot}N{\cdot}Q/S{\cdot}M{\cdot}P \qquad (5)$$

wherein $f_p/f_{sc} = Q/P$ and $P$ and $Q$ are positive integers.

The present invention may be brought into effect by selecting one or more parameters of the pulse transmission frequency $f_p$, the audio PCM frame frequency $f_{sa}$, the horizontal scanning frequency $f_h$, the number K of the horizontal scanning lines in one television frame and the color sub-carrier frequency $f_{sc}$ so as to satisfy the above equations (2), (4) and (5).

Next the number $X$ of the audio multiplexed channels will be explained. Each audio PCM frame is composed of J pulses as expressed by the equation (5). If it is assumed that the number of quantizing digits for an audio sample is D and the number of pulse transmission levels is E, one audio sample is consisted of $F = D{\cdot}2/E$ pulses. In one audio PCM frame composed of J pulses there can be inserted X multiplexed channels including the digital synchronizing signal as expressed in an equation (6).

$$X = J/F \qquad (6)$$

Here the number of channels $X$ defined by the equation (6) is denoted as the number of channels in the audio frame period. Now for a moment it is assumed that a similar PCM signal is transmitted in also the video frame period and the number of multiplexed channels in the video frame period is defined by the following equation (7).

$$Y = I/F \qquad (7)$$

In an ordinary PCM transmission system $X$ and $Y$ are integers. That is, the transmission parameters are so selected that $I$ and $J$ of the equations (4) and (5) are divisible by $F$.

According to the invention in order to increase a degree of freedom in selecting the transmission parameters, $X$ and $Y$ may not be integers. That is to say a case in which $I$ and $J$ cannot be divided by $F$ and a residue is produced is permissible. In such a case of synchronization circuit in a receiver can pull into a synchronization even if a residue is existent.

Next how to calculate the transmission parameters will be explained by way of examples.

EXAMPLE 1

In a first example 1, the transmission system for the video signal is made in accordance with NTSC standard signal system. In this case, the number of scanning lines K is 525, so that from the equation (2), the following equation (8) may be derived.

$$R = 525 \cdot M/N = 3 \cdot 5^2 \cdot 7 \cdot M/N \qquad (8)$$

Here $R$ *is a positive integer, so that in order to satisfy the equation* (8), $N$ should be selected as follows:

$$N = 1, 3, 5, 7, 15, 21, 25, 35 \ldots \qquad (9)$$

The color sub-carrier frequency $f_{sc}$ has a given relation with respect to the horizontal synchronizing frequency $f_h$, i.e., $f_{sc} = 455 \cdot f_h/2$. Thus there is established a relation $T/S = 455/2$ and from the equation (4), the following equation (10) can be obtained.

$$I = 455 \cdot Q/2 \cdot P = 5 \cdot 7 \cdot 13 \cdot Q/2 \cdot P \qquad (10)$$

Here in order to make I an integer, it is necessary from the equation (10) to satisfy the following equation (11), $$Q/P = 2l,\ 2l/5,\ 2l/7,\ 2l/13 \qquad (11)$$

wherein $l$ is a positive integer. If it is determined as $Q/P = 2$, the following equation (12) can be obtained from the equation (5).

$$J = 455 \cdot N/M = 5 \cdot 7 \cdot 13 \cdot N/M \qquad (12)$$

From this equation (12) one can determine M.

In the following table 1 there are shown several examples of the number of multiplexed channels X and the pulse transmission frequency $f_p$, which satisfy the equations (2), (4) and (15) under the conditions of $M<N$, i.e., $f_h>f_{sa}$, $D$–8 and $E$=4. In the table 1, numerals adopted in the above mentioned embodiment are denoted by * marks.

Table 1

| channels $f_p/f_{sc}$ | $f_p$[MHz] | $f_{sa}/f_h$ | $f_{sa}$[KHz] | Number of audio multiplexed: Integer portion $X_0$ | Residue $X_1$ |
|---|---|---|---|---|---|
| | | 1 | 15.734 | 113 | 3 |
| | | 5/7 | 11.239 | 159 | 1 |
| 2 | 7.159090 | 13/21 | 9.740 | 183 | 3 |
| | | 1 | 15.734 | 91 | 0 |
| | | 4/5 | 12.587 | 113 | 3 |
| | | 2/3 | 10.489 | 136 | 2 |
| | | 13/21 | 9.740 | 147 | 0 |
| 8/5 | 5.727272 | 4/7 | 8.990 | 159 | 1 |
| | | 1 | 15.734 | 65 | 0 |
| | | 4/5 | 12.587 | 81 | 1 |
| 8/7 | 4.090909 | 2/3 | 10.489 | 97 | 2 |
| | | 1 | 15.734 | 97 | 2 |
| | | 5/7 | 11.239 | 136 | 1 |
| 12/7 | 6.136363 | 2/3 | 10.489 | 146 | 1 |
| | | 1 | 15.734 | 96 | 1 |
| 22/23 | 6.057691 | 5/7 | 11.239 | 134 | 3 |
| | | 1 | 15.734 | 105 | 0 |
| | | 4/5 | 12.587 | 131 | 1 |
| | | 5/7 | 11.239 | 147 | 0 |
| 24/13 | 6.608391 | 2/3 | 10.489 | 157 | 2 |
| | | 1 | 15.734 | 104 | 0 |
| | | 4/5 | 12.587 | 130 | 0 |
| | | 2/3* | 10.489* | 156* | 0* |
| 64/35* | 6.545454* | 4/7 | 8.990 | 182 | 0 |
| 864/455 | 6.7972 | 2/3 | 10.489 | 162 | 0 |

In the above embodiment, the video signal is the same as that of NTSC system and the transmission parameters are established as follows;

color sub-carrier frequency: $f_{sc}$ = 3.579545 MHz, horizontal scanning frequency: $f_h$ = $2f_{sc}/$= 15.734 KHz, and /455 the number of scanning lines: $K$ = 525.

EXAMPLE 2

Next a case in which a transmission system of the video signal is different from NTSC system will be explained.

In NTSC system the color sub-carrier frequency is selected as odd multiples of a half of the television frame frequency and the horizontal scanning frequency in order to attain a time integration function and a space integration function so as to avoid a dot interference of the color sub-carrier. Moreover, in order to obviate a beat interference between the color sub-carrier and an audio carrier, the horizontal scanning frequency is determined as a fraction of an integer of the audio carrier frequency. In this manner in NTSC system there are various limitations for the color sub-carrier $f_{sc}$ and the horizontal scanning frequency $f_h$. However in the still picture-sound transmission system according to the invention it is not necessary to transmit the audio carrier and if it is not required to achieve the time and space integration functions, the color sub-carrier frequency $f_{sc}$ and the horizontal scanning frequency $f_h$ can be arbitrarily determined without taking into account given frequency relations in NTSC system or any other color television transmission system. In some cases it is rather advantageous to change a little standard television system so as to increase a degree of freedom in selecting the transmission parameters of the still picture-sound multiplexing transmission system.

In a table 2, there are shown combination of the transmission parameters which satisfy the conditions defined by the equations (2), (4) and (5) in case of slightly revising the given frequency relation (i.e., $f_h = 2f_{sc}/455$) in NTSC system between the color sub-carrier frequency $f_{sc}$ and the horizontal scanning frequency $f_h$ to a frequency relation of $f_h = 2f_{sc}/456$.

Table 2

| $f_p/f_{sc}$ | $f_p$[MHz] | $f_{sa}/f_h$ | $f_{sa}$[KHz] | Number of audio multiplexed channels: Integer portion $X_0$ | Residue $X_1$ |
|---|---|---|---|---|---|
| 2 | 7.159090 | 1 | 15.699 | 114 | 0 |
| | | 4/5 | 12.559 | 142 | 2 |
| | | 2/3 | 10.466 | 171 | 0 |
| | | 3/5 | 9.419 | 190 | 0 |
| | | 4/7 | 8.971 | 199 | 2 |
| 3/2 | 5.369317 | 1 | 15.699 | 85 | 2 |
| | | 2/3 | 10.467 | 128 | 1 |
| | | 3/5 | 9.419 | 142 | 2 |
| 5/3 | 5.965908 | 1 | 15.699 | 95 | 0 |
| | | 4/5 | 12.559 | 118 | 3 |
| | | 5/7 | 11.214 | 133 | 0 |
| | | 2/3 | 10.466 | 142 | 2 |
| | | 4/7 | 8.971 | 166 | 1 |
| 7/4 | 6.264203 | 1 | 15.699 | 99 | 3 |
| | | 3/5 | 9.419 | 166 | 1 |

In these examples the following video signal transmission system is used instead of NTSC standard system;

color sub-carrier frequency: $f_{sc} = 3.579545$ MHz,
horizontal scanning frequency: $f_h = 2f_{sc}/456 = 15.699$ KHz, and
the number of scanning lines: $K = 525$.

In table 3, there are illustrated combination of the transmission parameters in a case wherein the relation between the color sub-carrier frequency and the horizontal scanning frequency is the same as that in NTSC system, but the number of scanning lines K is selected as $K$=531.

Table 3

| $f_p/f_{sc}$ | $f_p$[MHz] | $f_{sa}/f_h$ | $f_{sa}$[KHz] | Number of audio multiplexed channels: Integer portion $X_0$ | Residue $X_1$ |
|---|---|---|---|---|---|
| 2 | 7.15909 | 1 | 15.734 | 113 | 3 |
| | | 7/9 | 12.237 | 146 | 1 |
| 8/5 | 5.7272 | 1 | 15.734 | 91 | 0 |
| | | 7/9 | 12.237 | 117 | 0 |
| 12/7 | 6.1363 | 1 | 15.734 | 97 | 2 |
| | | 2/3 | 10.489 | 146 | 1 |
| 24/13 | 6.60839 | 1 | 15.734 | 105 | 0 |
| | | 2/3 | 10.489 | 157 | 2 |
| | | 7/9 | 12.237 | 135 | 0 |

In the examples shown in the table 3, the video signal transmission system is different from NTSC system and various parameters are selected as follows, color sub-carrier frequency: $f_{sc} = 3.579545$ MHz,
horizontal scanning frequency: $f_h = 2f_{sc}/455 = 15.734$ KHz, and
the number of scanning lines: $K = 531$.

In a table 4, there are shown combination of the transmission parameters in a case of $f_{sc} = 456\, f_h/2$ and $K = 531$.

Table 4

| $f_p/f_{sc}$ | $f_p$[MHz] | $f_{sa}/f_h$ | $f_{sa}$[KHz] | Number of audio multiplexed channels: Integer portion $X_0$ | Residue $X_1$ |
|---|---|---|---|---|---|
| 2 | 7.15909 | 1 | 15.699 | 114 | 0 |
| | | 2/3 | 10.466 | 171 | 0 |
| 5/3 | 5.96591 | 1 | 15.699 | 95 | 0 |
| | | 5/9 | 8.722 | 171 | 0 |
| 3/2 | 5.36932 | 1 | 15.699 | 85 | 2 |
| | | 2/3 | 10.466 | 128 | 1 |
| 7/4 | 6.26420 | 1 | 15.699 | 99 | 3 |
| | | 7/9 | 12.210 | 128 | 1 |

In these examples both the horizontal scanning frequency and the number of scanning lines are different from those of NTSC system. That is, color sub-carrier frequency: $f_{sc} = 3.579545$ MHz,
horizontal scanning frequency: $f_h = 2f_{sc}/456 = 15.699$ KHz, and
the number of scanning lines: $K = 531$.

In some examples shown in the tables 1 to 4, there are residues in the audio frame period. That is to say in these examples I and J cannot be divided by $F$=4. In these tables, quotients of $J$ divided by $F$ are denoted as $X_0$ and residues are expressed as $X_1$.

In the above tables many examples of combinations of the transmission parameters are shown. In order to simplify the construction of a receiver, it is advantageous to establish a ratio N:M of the horizontal synchronizing frequency $f_h$ and the audio PCM frame frequency $f_{sa}$ and a ratio P:Q of the color sub-carrier frequency $f_{sc}$ and the pulse transmission frequency $f_p$ as simple integer ratios. A transmission bandwidth of the audio signal is ideally a half of the audio sampling frequency, so that it is advantageous to use the higher sound sampling frequency, i.e., the higher audio PCM frame frequency $f_{sa}$ for obtaining high quality sounds at a receiver end. On the contrary, the lower the audio PCM frame frequency is used, the more the number of multiplexed channels can be obtained. The audio PCM frame frequency must be established to compromise both requirements mentioned above. In case of using a telephone line as a transmission line, the transmission bandwidth of the audio signal is about 3.3 KHz with the sampling frequency of 8 KHz. A frequency bandwidth of a small size radio receiver set of medium class is about 5 KHz. Considering such facts in the still picture-sound transmission system for broadcasting, it is proper to use the audio transmission bandwidth of about 5 KHz and the audio PCM frame frequency of about 10 KHz. In NTSC system the horizontal synchronizing frequency is about 15.75 KHz, so that in the transmission system according to the invention it is preferable to determine the ratio N:M of the horizontal scanning frequency $f_h$ and the audio PCM frame frequency $f_{sa}$ as 3:2. In such a case, the audio PCM frame frequency $f_{sa}$ is equal to about 10.5 KHz. Moreover, if the ratio P:Q of the color sub-carrier frequency $f_{sc}$ and the pulse transmission frequency $f_p$ is selected as 1:1 or 1:2, then a color sub-carrier regenerating circuit and a PCM bit clock regenerating circuit in a receiver may be constructed as a common circuit.

FIG. 16 shows a basic construction of a circuit at a receiver end which receives a transmitted signal having the synchronizing signal added thereto and regenerates the synchronizing signal. The received signal is supplied to a PFP detector 149 to detect the PCM frame pattern PFP shown in FIG. 7 in the digital synchronizing signal DS. On the basis of the detected PFP a MCC detector 151 detects the mode control code MCC from the digital synchronizing signal DS. By means of these detected PFP and MCC signals there are regenerated from a synchronizing signal regenerator 153 the horizontal synchronizing signal, the sound sampling signal and the vertical synchronizing signal.

FIG. 17 shows in detail an embodiment of the synchronizing signal regenerating circuit at a receiver end. The circuit comprises a bit clock regenerator 155 which derives the timing burst signal TBS from the PCM frame pattern PFP shown in FIG. 7 and produces bit clocks of the same period as that of the timing burst signal TBS and synchronized therewith. The circuit further comprises a four-level discriminator 157 which detects four levels of the four-level PCM signal (FIG. 6) and also serves as a pulse shaper.

FIG. 18 illustrates a detailed construction of the four-level discriminator 157. The discriminator 157 comprises three differential amplifiers 159, 161 and 163 having one terminals connected commonly to an input terminal and the other terminals connected to three reference voltage sources $E_1$, $E_2$ and $E_3$, respectively, and three D type flip-flops 165, 167 and 169 connected to output terminals of the differential amplifiers 159, 161 and 163, respectively, for holding their outputs. The four-level discriminators 157 comprises an inhibition gate 171 having an inhibition terminal connected to an output of the flip-flop 169 and the other terminal connected to an output of the flip-flop 165. The discriminator 157 further comprises a phase adjuster 173 which receives the bit clocks of 6.54 MHz from the bit clock regenerator 155 shown in FIG. 17 and produces stroke pulses for the D type flip-flops 165, 167 and 169.

The input four-level signal is composed of four levels 0, 1, 2 and 3 as shown in FIG. *6b*. The discriminator 157 detects these levels and converts them into two bit signals 00, 01, 11 and 10, respectively. The differential amplifier 159 detects whether an input level is 0 or 1, the amplifier 161 detects whether an input level is lower than 1 or 2 and the differential amplifier 163 detects whether an input level is higher than 2 or 3. Thus if an input level is 0, all outputs of the amplifiers 159, 161 and 169 are 0, so that outputs of the flip-flops 165, 167 and 169 triggered by strobe pulses are 0 and there are produced 0 outputs at both an upper output terminal 175 and a lower output terminal 177. When an input level is 1, an output of the amplifier 159 becomes 1, but both outputs from the amplifiers 161 and 163 are 0, so that 1 is produced at the output terminal 177 and 0 appears at the output terminal 175. When an input level is 2, outputs of the amplifiers 159 and 161 are 1, but an output of the amplifier 163 is 0. Thus, there are produced 1 at both output terminals 175 and 177. If an input level is 3, all outputs of the amplifiers 159, 161 and 163 become 1, but the inhibition gate 171 is closed by an output from the flip-flop 169, so that 0 output appears at the output terminal 175 and 1 output is produced at the output terminal 177. The relation of the input levels and output bits can be summarized in the following table 5.

Table 5

| Input level | Output | |
|---|---|---|
| | Output 175 | Output 177 |
| 0 | 0 | 0 |
| 1 | 0 | 1 |
| 2 | 1 | 1 |
| 3 | 1 | 0 |

In this manner an input four-level audio PCM signal can be converted into an output two-level audio PCM signal. The four-level discriminator 157 also discriminates the digital synchronizing signal DS shown in FIG. 7. As shown in FIG. 6, the digital synchronizing signal DS is transmitted as a signal having the two extreme levels 0 and 3 of the four-level audio PCM signal. Therefore, it is sufficient to detect the output signal supplied from the upper output terminal 175 of the four-level discriminator 157. Thus as shown in FIG. 17 to the output terminal 175 of the discriminator 157 is connected a synchronizing pattern detector 179. This detector 179 compares the output signal from the four-level discriminator 157 with the waveforms of PFP and MCC signals which have been previously set in the detector 179 and detects the PFP signal and then further detects the MCC signal on the basis of the detected PFP signal, so that the detector 179 produces the control signals A, H and F for synchronization and the signals $M_0$, $M_1$, $M_2$ and $M_3$ for indicating to which frame, the video frame VF, the first audio frame $A_1F$ or the second audio frame $A_2F$ does the received signal belong.

The synchronizing signal regenerating circuit shown in FIG. 17 further comprises gates 181, 183 and 185. The gate 181 makes a logical product of the signal A and a signal having the same period as that of the PCM frame synchronizing signal and obtained by counting down the bit clocks and is opened to pass the bit clocks when both signals coincide with each other. The gate 183 forms a logical product of the signal H and a signal having the same period as that of the horizontal synchronizing signal and obtained by counting down the bit clocks and is opened to pass the bit clocks when both signals coincide with each other. The gate 185 makes a logical product of the signal F and a signal obtained by counting down the bit clocks and having the same period as that of the television frame synchronizing signal and is opened to pass the bit clocks when both signals coincide to produce a signal having the same rate as that of the television frame.

The bit clocks passed through the gate 181 are supplied to an audio PCM frame synchronizing signal generator 187 which may be consisted of for example a counter. The generator 187 counts down the bit clocks of 6.545454 MHz by one six-hundred twenty-fourths to produce the audio PCM frame synchronizing signal of 10.489 KHz. The bit clocks passed through the gate 183 are supplied to a horizontal synchronizing signal generator 189 which may be also formed by a counter. The generator 189 counts down the bit clocks of 6.545454 MHz by one four-hundred sixteenths to produce the horizontal synchronizing signal of 15.734 KHz.

The generators 187 and 189 are followed by error detectors 191 and 193, respectively. The error detector 191 compares the output signal from the generator 187 with the signal A from the synchronizing pattern detector 179 and the error detector 193 compares the output signal from the generator 189 and the signal H from the detector 179 and they produce informations indicating coincidence of these signals to a forward and backward synchronization protector 195 and a backward synchronization protector 197, respectively. The forward and backward synchronization protector 195 starts to operate when it receives successive ten coincidence outputs from the error detector 191 and once it has been actuated it will continue to operate until there are not existent ten successive coincidence outputs. During the operation of the forward and backward synchronization protector 195, it controls the gate 181 and the gate 181 is always opened. The forward and backward synchronization protector 195 is consisted of a counter for counting the number of coincidences and a counter for counting the number of discordances, these counters being actuated by pulses having a given period (in this embodiment the PCM frame period). If the synchronization is not established, after the discordance counter has counted ten successive discordances it counts up and at the same time the coincidence counter is reset and an output is returned to zero. In case of the frame synchronization being established after the coincidence counter has counted ten successive coincidences, it counts up and its output becomes 1 to reset the discordance counter. Under a condition of an asynchronization, i.e., a count up condition of the discordance counter, after the coincidence counter has begun to count coincidences, if even a single coincidence pulse is lost during the counting of ten coincidences, the coincidence counter is immediately reset. In the same manner under a count up condition of the discordance counter, after the discordance counter has begun to count several discordances, if there is appeared even a single coincidence pulse at a given timing before the discordance counter counts 10 successive discordances, the discordance counter is immediately reset. Thus the coincidence counter is not reset and the initial operation condition is continued.

The backward synchronization protector 197 receives coincidence outputs from the error detector 193. Once the protector 197 is actuated, it continues to operate until ten successive coincidence outputs are lost. During the operation of the protector 197, it controls the gate 183 to always be opened. The reason why the backward synchronization protector 197 is not provided with a function of a forward synchronization protection is that the synchronization is begun to be established in the audio PCM period and during this period the signal H is produced only once, although there are produced three horizontal synchronizing signals, so that if there is a forward synchronization, it is impossible to complete the synchronization pulling condition.

The backward synchronization protector 197 is consisted of a counter for counting the number of discordances. The counter is reset by a single coincidence pulse which appears before the counter has counted ten successive discordances.

The synchronizing signal regenerating circuit shown in FIG. 17 further comprises a vertical synchronizing signal generator 199 which counts the PCM frame synchronizing pulses supplied from the forward and backward synchronization protector 195 through the gate 185 and generates the vertical synchronizing signal. The output signal from the generator 199 is supplied to a vertical synchronizing signal output terminal and to an error detector 201 to which is also supplied the signal F from the synchronizing pattern detector 179. The error detector 201 compares these signals and produces an output coincidence pulse when these timings are coincide with each other. The coincidence pulse is supplied to a backward synchronization protector 203 which continues to operate until the error detector 201 does not detect more than ten successive discordances. During the operation of the protector 203, it controls the gate 185 to be always opened, so that the PCM frame pulses can be supplied to the vertical synchronizing signal generator 199.

When the PCM frame synchronization and the horizontal synchronization are not established, both output signals of the forward and backward synchronization protector 195 and the backward synchronization protector 197 are 1. These output signals of 1 are supplied to the bit clock regenerator 155 through OR gates 205 and 207. Thus, the bit clock regenerator 155 can detect the signal continuously. The synchronizing signal regenerating circuit further comprises a pulse switcher 209 and a video-audio frame detector 211. To the video-audio frame detector are supplied the signals $M_0$, $M_1$, $M_2$ and $M_3$ from the synchronizing pattern detector 179. The detector 211 detects coincidences of the signals $M_0$, $M_1$, $M_2$ and $M_3$ and the output pulse from the pulse switcher 209 and produces a video-audio frame switching signal for selecting the video-frame and the audio frame. In a simplest embodiment of the video-audio frame detector 211, use is made of a D type flip-flop as a memory. The signal $M_0$ of the mode control code is 1 in the video frame and 0 in the audio frame, so that this signal $M_0$ is written in the D type flip-flop to form the video-audio frame switching signal.

The audio PCM frame synchronizing signal from the generator 187 and the horizontal synchronizing signal from the generator 189 are supplied to a gate pulse switcher 213 as gate pulses having a width of a time duration of the PFP signal and having periods of the PCM frame period and the horizontal synchronizing period, respectively. The gate pulse switcher 213 is switched by the switching pulse supplied from the video-audio frame detector 211 in accordance with a fact that the transmitted signal is of the video frame or of the audio frame to pass the gate pulses of the horizontal scanning period in the video frame and gate pulses of the audio PCM frame period.

After the horizontal synchronization and the PCM frame synchronization have been established, the outputs of the forward and backward synchronization protector 195 and the backward synchronization protector 197 become 0, and then the gate pulse from the gate pulse switcher 213 is supplied to the bit clock generator 155 through the OR gate 207 and the timing burst signal TBS for establishing the bit synchronization is derived out only from the PFP signal inserted at a rate of the PCM frame period or the horizontal scanning period.

FIG. 19 shows a detailed construction of the pulse switcher 209, the video-audio frame detector 211, the gate pulse switcher 213 and the OR gate 207. As explained above, the signal $M_0$ from the synchronizing pattern detector 179 is written in the video-audio frame detector 211 consisting of the D type flip-flop. To the pulse switcher 209 are supplied the audio PCM frame synchronizing signal from the audio PCM frame synchronizing signal generator 187 and the horizontal synchronizing signal from the horizontal synchronizing signal generator 189 and makes a logical product of the bit clock and the output from the video-audio frame detector 211. The output signal from the detector 211 is 1 in the video frame period and 0 in the audio frame period as will be explained later. Thus, the output of the pulse switcher 209 is the horizontal synchronizing signal in the video frame period and the audio PCM frame synchronizing signal in the audio period. These output synchronizing signals are used as clock pulses for triggering the D type flip-flop of the video-audio frame detector 211. Thus, the output signal of the detector 211 is held to a logic level 1 of the signal $M_0$ in the video frame period and is held to a logic level 0 of the signal $M_0$ in the audio frame period.

To the video-audio frame detector 211 the error signal (which is 1 in an asynchronization condition and 0 in a synchronization condition) is supplied as a reset signal from the OR gate 205 through an inverter 215. The detector 211 is reset when the reset signal is 0, so that under the asynchronization condition the detector 211 is reset and the output is always 0.

In the gate pulse switcher 213 the PCM frame synchronizing signal and the horizontal synchronizing signal are supplied to inhibition gates 217 and 219, respectively. These gates 217 and 219 make logical products of these signals and the output from the detector 213 and produce the horizontal synchronizing signal in the video frame period and the audio PCM frame synchronizing signal in the audio frame period, respectively.

FIG. 20 shows a detailed construction of the synchronizing pattern detector 179. The detector 179 comprises a shift register 221 of 16 bits which is set successively by a pulse chain supplied to a series input terminal 223 from the four-level discriminator 157. The detector 179 further comprises a pattern coincidence detector 225 having a reference input electrodes 227 alternate electrodes of which are connected to an earth potential corresponding to a logic level 0 and the remaining reference input electrodes being connected to a given potential corresponding to a logic level 1. The pattern coincidence detector 225 further has comparison input terminals 229 connected to parallel output terminals of the shift register 221. The detector 225 compares signals supplied to these input terminals and detects a coincidence of these signals. When the later portion of the signal PFP is applied to the comparison input terminals 229, a coincidence output is produced at an output terminal 231. This coincidence output is supplied to one input terminals of AND gates 233, 235 and 237 and to the other input terminals of these AND gates are supplied the signals H, A and F, respectively, which signals have been set in the shift register 221.

The synchronizing pattern detector 179 operates as follows.

A pulse chain derived from the four-level discriminator 157 is written in the shift register 221 through the series input terminal 223 by bit clocks supplied to a bit clock terminal 239. When the last signal of the digital synchronizing signal DS shown in FIG. 7 has been written in the shift register 221, the last eight bits of the PFP signal and the MCC signal of eight bits have been written in the shift register 221. The pattern coincidence detector 225 compares parallel inputs composed of the last eight bits of the PFP signal and the first one bit of the MCC signal with the reference inputs supplied to the reference input terminals 227 to detect a coincidence of these signals. If there is a coincidence, the output signal of the detector 225 at the output terminal 231 becomes a logic level 1. In such a case if the signal H in the MCC signal is 1, then the AND gate 233 produces an output of 1 to regenerate the signal H. In the same manner the signals A and F are regenerated from the AND gates 235 and 237, respectively. Moreover, the signals $M_0$, $M_1$, $M_2$ and $M_3$ of the MCC signal are derived from parallel output terminals of first four bits supplied to the series input terminal 223 of the shift register 221.

FIG. 21 illustrates a detailed construction of the error detector 191 and the forward and backward synchronization protector 195. The signal A supplied from the synchronizing pattern detector 179 is supplied directly to an AND gate 241 and is also supplied to an AND gate 243 through an inverter 245. To the remaining inputs of the AND gates 241 and 243 are supplied the audio PCM frame synchronizing signal from the generator 187 and the bit clocks. If the signal A coincides with the other signals, the AND gate 241 produces an output of 1. On the contrary if the signal A does not coincide with the other signals, the other AND gate 243 produces an output of 1. The output of the AND gate 243 is supplied to a discordance counter 247, which produces a discordance output signal of a logic level 1 when it has counted ten successive audio PCM frame synchronizing signal pulses supplied from the AND gate 243 under an out of synchronizing condition.

The output pulse of the AND gate 241 is supplied to a coincidence counter 249 which produces a coincidence output of a logic level 1, when it has counted ten successive audio PCM frame synchronizing pulses supplied from the AND gate 241 under a synchronizing condition.

The output signal of the counters 247 and 249 are fedback to input terminals through inverters 251 and 253, respectively, so that the counters 247 and 249 stop their counting operation when they count up and product the output signals.

The output of the AND gate 241 and the output of the coincidence counter 249 are connected to an AND gate 255 and an output of the AND gate is connected to a reset terminal of the discordance counter 247. Thus, after the coincidence counter 249 has counted up, the discordance counter 247 is reset by the output of the AND gate 255 at an instance with a next audio PCM frame synchronizing pulse appears. In the same manner, the coincidence counter 249 is reset by an output of an AND gate 257 when the AND gate 257 receives simultaneously the outputs of the discordance counter 247 and the AND gate 243.

Under the coincidence condition, the audio PCM frame synchronizing pulse is passed through an AND gate 259 and is applied to the gate 185. The output of the discordance counter 247 and the audio PCM synchronizing pulse are supplied to an AND gate 261 and the output of the AND gate 261 is supplied to the gate 181. After the discordance counter 247 has counted up, the output of the AND gate 261 becomes a logic level 1 at an instance when the audio PCM frame synchronizing pulse is supplied from the generator 187.

The coincidence counter 249 is always reset to indicate the discordance condition until the output signal A from the synchronizing pattern detector 179 and the audio PCM frame synchronizing signal from the generator 187 coincide with each other over successive ten periods. In such a condition the output of the discordance counter 247 becomes 1 and the AND gate 261 produces output signal of 1 each time the audio PCM frame synchronizing pulse appears. When the signals coincide with each other over ten successive periods, the discordance counter 247 is reset to indicate the discordance condition and the output signals of the counter 247 and the AND gate 261 become 0. This condition is maintained until the discordance counter 247 counts ten successive audio PCM frame synchronizing pulses under the discordance condition. That is in the counting up condition of the discordance counter 247, i.e., in the asynchronization condition, after the coincidence counter 249 has started to count the number of coincidence pulses when even a single coincidence pulse is lost before the coincidence counter 249 counts ten successive coincidence pulses, the discordance pulse from the AND gate 243 resets the coincidence counter 249 through the AND gate 257. Such an operation is referred to as the forward synchronization protection. In the counting up condition of the coincidence counter 249, i.e., in the synchronization condition, when a coincidence pulse is produced at a given timing before the discordance counter 247 counts ten successive discordance pulses, the discordance counter 247 is reset. This function is denoted as the backward synchronization protection.

FIG. 22 shows a detailed construction of the error detector 193 and the backward synchronization protector 197 shown in FIG. 17. There are provided AND gates 263, 265 and 267, inverters 269 and 271 and a discordance counter 273. The operation of the circuit shown in FIG. 22 is similar to that of the circuit shown in FIG. 21 and could be understood from the above explanation, so that the detailed explanation is omitted.

FIG. 23 shows a detailed construction of the bit clock generator. The bit clock generator shown in FIG. 23 can be used as a general bit clock generator. In the present invention since the periods of the horizontal synchronizing signal in the video frame period and the audio PCM frame synchronizing signal in the audio frame period are different from each other, the periods at which the bit clocks appear in the PFP signal also differ from each other. When the circuit shown in FIG. 23 is used as the bit clock generator 155 shown in FIG. 17, only a portion 275 is used and it is not necessary to use a portion 277, because the portion 277 is of a synchronization protector and such a protector has already been provided in the circuit shown in FIG. 17.

To an input terminal 279 of the bit clock generator 155 is applied the input signal shown in FIG. 6. This input signal is supplied to a waveform shaper 281 in which the input signal is passed through a tank circuit tuned to a fundamental frequency of the bit clock signal so as to be full-wave rectified and is also passed through a differential circuit so as to increase an amount of timing information, so that the timing information can be easily derived out. The output signal from the shaper 281 is supplied to a gate 283 which is always opened when the PCM frame synchronization is not established and is opened solely by the PCM frame synchronizing signal after the PCM frame synchronization is established. The output signal from the gate 283 is supplied to a band-pass-filter 285 which passes signal components having frequencies near the frequency of the timing signal contained in the PFP signal. The output signal of the filter 285 is supplied to a phase comparator 287 which compares a phase of the output signal from the filter 285 with that of the continuous timing signal supplied from an output terminal of a voltage controlled oscillator 293 and produces an error voltage. The error voltage is applied to a sample-hold circuit 289 which is opened and closed in synchronism with the gate 283. The circuit 289 can pass the output error voltage from the phase comparator 287 only when the PFP signal is received after the frame synchronization has been established and in other period the circuit 289 holds at a capacitance C the output error voltage which exists just before the circuit is closed.

The output signal from the sample-hold circuit 289 is supplied to a low-pass-filter 291 which passes low frequency components of the output signal of the phase comparator 287 through the sample-hold circuit 289 so as to provide a given loop time constant. The error voltage is applied to the voltage controlled oscillator 293. An oscillation frequency and a phase are controlled by the error voltage and the oscillator produces a continuous bit clock signal having the same phase and frequency as those of the timing burst signal in the input signal.

The timing signal generated from the oscillator 293 is supplied to a frequency divider 295 which divides in frequency the bit clock signal by the number of bits ($r$) in one audio channel so as to produce a signal having a frequency corresponding to the number of channels. The output pulses of the frequency divider 295 are supplied to a channel counter 297 which counts the output pulses from the frequency divider 295, the number of which corresponds to the number of channels ($m$) in a single frame of the PCM signal and produces an output pulse having the same time width as that of the timing burst signal period for every PCM frame synchronizing period.

The output signal from the counter 297 and the input signal supplied to the input terminal 279 are supplied to a first AND gate 299 and the output signal from the counter 297 and the output signal from the oscillator 293 are supplied to a second AND gate 301. The first AND gate 299 makes a logical product of the output pulses of the frame period from the channel counter 297 and the input signal so as to derive the input signal for a time duration corresponding to the burst signal period. The second AND gate 301 derives the bit clock signal for a time duration corresponding to the burst signal period. The output timing signal of the AND gate 301 is supplied to a frame pattern generator 303 which produces an output signal having the same waveform as that of the PCM frame synchronizing signal of the input signal. The output signals of the AND gate 299 and the frame pattern generator 303 are supplied to a discordance detector 305 which compares these signals and detects a coincidence.

When the discordance detector 305 detects a discordance, a synchronization protector 307 having the construction shown in FIG. 22 produces a trigger pulse from an output terminal 309. By means of the trigger pulse, the frequency divider 295, the channel counter 297 and the frame pattern generator 303 are reset. The synchronization protector 307 has the same construction as that shown in FIG. 22 and can obviate spurious synchronization due to noise. Moreover once the frame synchronization has been established, the above resetting operation is not effected as long as several discordances are not detected successively. In a coincidence condition, the synchronization protector 307 produces output pulses synchronized with the frame synchronizing signal from an output terminal 310. These gate pulses synchronized with the frame synchronizing pulses are supplied to the gate 283 and the sample-hold circuit 289 through an OR gate 311. There is also provided with an output terminal 313, from which the frame synchronizing puises to be used in a receiver are produced. The oscillator 293 has another output terminal 315 which supplies the timing burst signal, i.e., the bit clock signal without jitter to be used for decording the PCM signal.

The bit clock generator shown in FIG. 23 operates as follows:

When the frame synchronization is not established, the gate 283 and the sample-hold circuit 289 are kept opened. Thus the input signal is passed through the gate 283 and a given frequency component of the input signal which is the same as the burst signal is derived out by the band-pass-filter 285. This component is compared in the phase comparator 287 with the output signal from the oscillator 293 which has the same frequency as that of the timing signal. The oscillator 293 is controlled by the output error voltage from the phase comparator 287 and there is established a rather coarse bit synchronization. The accuracy of such a coarse bit synchronization is similar to that of the known system and is not so high to be able to decode precisely a multi-level PCM signal, at which the present invention aims, but such a coarse bit synchronization is sufficient to establish the frame synchronization. The output signal from the oscillator 293 is supplied to the feame synchronization means 277.

In this embodiment the frame synchronization means 277 is constructed by a reset repetition type synchronizing circuit. That is, the $1/r$ frequency divider 295 and the channel counter 297 make a gate signal at timings of slots of each channel and of slots of the frame synchronization from the bit clock signal supplied by the voltage controlled oscillator 293. A pulse width of the output pulse of the channel counter 297 is equal to a width of the slots of the frame synchronization. The first AND gate 299 gates out the input signal supplied to the input terminal 279 by the slots of the frame synchronizing period and the gated out signal is supplied to the discordance detector 305. In the similar manner the second AND gate 301 gates out the bit clock signal supplied from the oscillator 293 by means of the gate signal of the slot width of the frame synchronizing signal and actuates the frame pattern generator 303. The discordance detector 305 compares the given code pattern supplied from the frame pattern generator 303 and the code pattern of the input signal. If these code patterns coincide with each other, that is if all of $r$ bits in a slot of the frame synchronizing signal coincide with each other, then it is determined that the frame synchronization is established. On the contrary if even only a single bit does not coincide, the frame synchronization is not established, so that the channel counter 297, $1/r$ frequency divider 295 and the frame pattern generator 303 are resest by the output signal supplied from the synchronization protector 307. With repeating such an operation it is possible to establish the synchronization. During the asynchronous condition there is produced continuously the signal indicating such a condition at the output terminal 310 of the synchronization protector 307 and this signal controls the gate 283 and the sample-hold circuit 289 through the OR gate 311 to an operable state so that the timing signal including the audio PCM signal as well as this timing burst signal are continuously derived from the input signal.

After the frame synchronization has been established, the signal indicating the asynchronization at the output terminal 310 of the synchronization protector 307 becomes 0 and from the OR gate 311 there is produced a timing burst deriving pulse synchronized with the frame synchronizing signal supplied from the channel counter 297. In the present embodiment the frame synchronizing signal serves as the timing burst signal. In such a case the timing burst portion (frame synchronizing signal) of the input signal is derived at the gate 283 by the timing burst deriving pulse and only this derived portion is compared with the output signal from the voltage controlled oscillator 293 and the comparison output voltage is applied to the oscillator 293 through the sample-hold circuit 289 so as to control the phase and frequency of the output signal from the oscillator 293 and the comparison output voltage is held in the capacitance C, so that the voltage controlled oscillator 293 is locked for a period other than the burst period. After the frame synchronization has been established, the output signal of the oscillator 293 gets a phase information only from the burst signal BS, so that it is possible to obtain the bit clock signal having sufficiently reduced jitter by selecting the burst signal period having a necessary duration.

In the embodiment shown in FIG. 23, the bit clock signal is produced by the phase controlled type oscillator 293, but it may be possible to actuate a ring oscillator by means of the burst signal derived by the gate 283 from the input signal so as to form a continuous bit clock signal the same phase as that of the burst signal.

Next the operation of the synchronizing signal regenerating circuit shown in FIG. 17 will be explained with reference to FIG. 24. FIG. 24*a*, *b*, *c*, and *d* show the digital synchronizing signal, the bit clock signal, the synchronizing pattern detector output and the counter output of the audio frame synchronizing circuit, respectively. In FIG. 24*c*, detected outputs due to similar patterns are shown by dotted lines.

In the bit clock generator 155, the bit clock synchronizing signal shown in FIG. 24*b* are derived from the input PFP signal. The input signal is supplied to the four-level discriminator 179 and the discrimination of four-levels and pulse shaping are effected therein. The synchronizing pattern detector 179 compares incoming signals with the PFP pattern which has been previously sotred and produces a coincidence pulse when both signals coincide with each other so as to effect the PFP synchronous detection. On the basis of the coincidence pulse, the signals A, H, F, $M_0$, $M_1$, $M_2$, and $M_3$ of the mode control code MCC which situate at given time positions are extracted from the PFP signal.

Next a process of establishing the PCM frame synchronization after the bit synchronization has been established will be explained. As described above, the bit clocks are produced continuously until the PCM frame synchronization and the horizontal synchronization will be established. Thus, the bit clocks supplied from the generator 155 constitute a pulse chain as shown in FIG. 24*b*.

FIG. 25 shows a detailed construction of the gate 181 which comprises a first inhibition gate 317 and a second inhibition gate 319. If the signal A supplied from the synchronizing pattern detector 179 is 0 and the output signal from the forward and backward sychronization protector 195 is 0, the output of the gate 317 is also 0, and the second gate 319 is opened, so that the bit clocks are passed through the gate 319 and are supplied to the audio PCM frame synchronizing signal generator 187. This condition is indicated in FIG. 24*d* by a reference U. The bit clocks are counted by the counter in the audio PCM frame synchronizing signal generator 187 and then the counter reaches a counting up state, its output becomes 1. This condition is shown in FIG. 24*d* at V. And if the discordance counter 247 of the forward and backward synchronization protector 195 shown in FIG. 17 is in a counting up condition, its output is also 1. If the signal A is not supplied from the synchronizing pattern detector 179 at that instance, the output of the first inhibition gate 317 is 1 and the second gate 319 is inhibited so that the bit clock is blocked and the audio PCM frame synchronizing signal generator 187 is held in the counting up state to produce the output 1 and its operation is stopped.

FIG. 24*c* illustrates the signal A supplied from the synchronizing pattern detector 179. In FIG. 24*c*, the solid lines indicate the signals in the MCC signal and dotted lines show pseudo-signals A caused by that signals in the PCM audio signal which are similar to the PFP signal.

If the signal A is supplied during the output of the protector 195 is 1, the first inhibition gate 317 is immediately inhibited and the gate 319 is released, so that the audio PCM frame synchronizing signal generator 187 returns to 0 again and starts to count the bit clocks. At the same time, it produces the audio PCM frame synchronizing signal from its output terminal. The error detector 191 is so constructed that it produces an output when a timing of the counting up of the audio PCM frame synchronizing signal generator 187 coincides with that of the output signal A from the synchronizing pattern detector 179. But at the condition V, these timings do not coincide with each other, so that there is not produced an output.

The audio PCM frame synchronizing signal generator 187 continues to count the bit clocks and when it reaches a counting up condition, its output becomes 1 again and the gate 181 is closed. Therefore, as explained above the generator 187 stops its counting operation. This condition is shown in FIG. 24*d* by X. At this condition X, the output of the protector 195 is also 1 and when the signal A is supplied to the gate 181 from the synchronizing pattern detector 179, the output of the generator 187 returns to 0 and it starts again to count the bit clocks.

As apparent from FIG. 24*d*, the pseudo signal is supplied to the gate 181 at a condition denoted by W and as the result thereof even when the generator 189 reaches a counting up state, (i.e., the condition X), the signal A does not appear and the output of the protector 195 is remained as 1 for a whole. The gate 131 is opened when the signal A is supplied. At a condition Y the true signal A of the MCC signal is supplied and the generator 187 starts to count the bit clocks. A timing that the generator 187 reaches a counting up state at a next time coincides with that of the signal A. This condition is denoted by Z in FIG. 24*d*. This condition Z may be regarded as that the PCM frame synchronization has been established.

As mentioned above, each time when a timing of the counting up condition of the generator 189 is coincident with a timing of the signal A, the error detector 191 produces an output pulse. The protector 195 counts such output pulses. If the protector 195 counts ten successive such output pulses, i.e., the condition Z occurs successively ten times, it produces always 0 outputs without repeating the above operations. Thus, the output of the first inhibition gate 317 is always kept to 0 and the second gate 319 is always opened. Therefore the generator 187 does not start its counting operation every time the signal A appears, but repeats it count starting and counting up (i.e., resetting) operations at a given period. As described above, the number of counts is equal to the number of bits included in one frame of the audio PCM signal, so that the generator 187 produces the audio PCM frame synchronizing signal at a rate of the PCM frame period, i.e., at the same period as that of occurrence of the signal A in the audio frame period and with the same timing thereof. Even if the signal A is lost due to noise or appearance of the video frame, the output signal of the forward and backward synchronization protection remains 0 unless the signal A is lost successively 10 times. If the signal A is lost successively more than ten times the initial condition appears again and the synchronization is established in the manner mentioned above with comparing the timings of the signal A and the counting up timings of the counter in the generator 187.

In the present embodiment, a protection range of the forward and backward synchronization protector 195 is determined to 10 times, but it may be selected as any number in independence on properties of a line through which the signal is transmitted.

Means consisting of the horizontal synchronizing signal generator 189, the error detector 193 and the backward synchronization protector 197 for producing the video horizontal synchronizing signal and means consisting of the gate 185, the vertical synchronizing signal generator 199, the error detector 201 and the backward synchronization protector 203 for generating the vertical synchronizing signal operate in the similar manner as explained above with respect to means for producing the audio PCM frame synchronizing signal with reference to FIGS. 24*a* to *d*.

However in case of producing the horizontal synchronizing signal the counting up period of the horizontal synchronizing signal generator 189 is equal to the period of the horizontal synchronizing signal and use is made of the signal H in the MCC signal as a reference signal. Moreover, the backward synchronization protector 197 differs from the forward and backward synchronization protector 195 in a point that it does not possess the forward synchronization protecting function by means of which the output signal is caused to be 0 when a timing of the counting up of the generator 189 coincides with that of the reference signal H.

The vertical synchronizing signal generating means also differs from the audio PCM frame synchronizing signal generating means in a point that the vertical synchronizing signal generator 199 counts the audio PCM frame pulses and there is not provided with the forward synchronization protecting function. It is true that the synchronization may be established more positively by giving the forward synchronization protecting function also to the vertical synchronizing signal generator 199. But the generator 199 counts the audio PCM frame synchronizing pulses which have a correct phase due to the fact that these pulses are passed through the forward and backward synchronization protector 195, so that the generator 199, the error detector 201 and the protector 203 operate at a correct timing of the audio PCM frame synchronizing signal. Thus the vertical synchronization might be drawn into the pseudo-signal only when the code error occurs due to noise. However a probability of occurrence of the code error due to noise is about $10^{-3}$ even in the worst case. Therefore in the present embodiment the forward synchronization protecting function is omitted in the vertical synchronizing signal generating means.

Next means for intermittently opening and closing the bit clock generator 155 will be explained. At first when the audio PCM frame synchronization and the video horizontal synchronization have not been established, both outputs of the forward and backward synchronization protector 195 and the backward synchronization protector 197 are 1. These output signals are supplied to the bit clock generator 155 through the OR gates 205 and 207 so that the bit clock generator 155 is always kept in an "open" condition.

Once the synchronization has been established, both output signals from the synchronization protectors 195 and 197 become 0. In such a case, the synchronizing signals are supplied to the pulse switcher 209 from the audio PCM frame synchronizing signal generator 187 and the horizontal synchronizing signal generator 189 and at the same time the gate signals having the same time duration as that of the PFP signal are supplied to the gate pulse switcher 213.

In the video-audio frame detector 211, the code signals $M_0$, $M_1$, $M_2$ and $M_3$ in the mode code control MCC are detected and these detected signals are compared with the synchronizing signal. The detector 211 produces an output signal for identifying the received signal, i.e., the video frame, the first audio frame or second audio frame. By means of such a detected signal, the gate pulse switcher 213 is controlled to pass the gate signal of the PCM frame synchronizing signal period from the audio PCM frame synchronizing signal generator 187 in the audio frame period and to pass the gate signal of the horizontal synchronizing signal period from the horizontal synchronizing signal generator 189 in the video frame period. In this manner the bit clock generator 155 can produce the bit clocks always with a correct timing both in the audio and video frame periods and the bit clocks thus generated may be used to decode the audio PCM signal and other data signals.

In the embodiment of the synchronizing signal regenerating circuit shown in FIG. 17, there is not provided with a forward synchronization protecting function in the horizontal synchronizing signal regenerating circuit portion. Thus there is a fear that the horizontal synchronization is pulled into a spurious synchronization by means of that signals in the received signal which are similar to the PFP signal. In such a case, it is possible to detect the spurious synchronization only when several successive discordances are detected by means of the backward synchronization protector 197, so that it needs a quite long time to establish the horizontal synchronization. Thus if the horizontal synchronization could not be established in an audio frame period, the synchronization establishing operation has to be effected firstly in a next audio frame period. In order to avoid such an inconvenience it is necessary to provide means for not extracting similar pattern signals in the received signal.

An embodiment of the synchronizing signal regenerating circuit having such means is illustrated in FIG. 26. In FIG. 26, the same portions as those shown in FIG. 17 are denoted by the same reference numerals. In the circuit shown in FIG. 26, AND gates 321 and 323 are provided at preceding stages of the gates 183 and 185, respectively. The AND gate 321 detects a coincidence of the output signal from the forward and backward synchronization protector 195 and the bit signal H from the synchronization pattern detector 179 and supplies a coincidence output to the gate 183 as a synchronizing gate pulse. Thus the gate 183 supplies correctly the synchronizing signal in the received signal to the horizontal synchronizing signal generator 187, so that the gate 183 cannot pass similar patterns in the received signal. Moreover when the audio PCM frame synchronization has not been established, the output signal of 1 from the forward and backward synchronization protector 195 has previously set up the counter in the horizontal synchronizing signal generator 189 and after the audio PCM frame synchronization has been established, the horizontal synchronization will be completed immediately when a first signal H becomes 1. In the same manner as mentioned above, the AND gate 323 in the vertical synchronizing signal generating circuit portion detects a coincidence of the PCM frame synchronizing signal from the audio PCM frame synchronizing signal generator 187 and the bit signal F from the synchronizing pattern detector 179 and the detected coincidence signal is supplied to the gate 185 as the vertical synchronizing information. In the out of synchronization condition of the audio frame, the counter in the vertical synchronizing signal generator 199 is set up by the output signal from the protector 195 and the synchronization pulling operation will be completed at an instance when a first code signal F in the MCC signal becomes 1 after the audio frame synchronization has been established.

In the embodiment explained above, the horizontal synchronization is established after the audio frame synchronization has been settled so that the horizontal synchronization is delayed.

In an embodiment shown in FIG. 27, the counters of the audio frame synchronizing signal generator and the horizontal synchronizing signal generator are combined to form a digital frame synchronizing signal generator so as to avoid the delay of the horizontal synchronization mentioned above.

Also in FIG. 27, the same circuit portions as those shown in FIG. 17 are denoted by the same reference numerals. In FIG. 27, there are additionally provided a gate 325, a digital frame synchronizing signal generator 327, an error detector 329 and a forward-backward synchronization protector 331 and an OR gate 332. A series circuit consisted of these circuits operates in the same manner as that explained with reference to the audio PCM frame synchronization. But in the present embodiment, the digital frame synchronizing signal generator 327 is controlled by the output signal from the video-audio frame detector 211 in such a manner that a counting value is changed between the video frame period and the audio frame period in order to produce a signal synchronized with the horizontal synchronizing signal in the video frame period and a signal synchronized with the audio PCM frame synchronizing signal in the audio frame period. The output signal from the generator 327 is called as the digital frame synchronizing signal DFS. Moreover, the synchronizing pattern detector 179 derives a signal D which appears at a rate of the PFP signal period. Therefore, this signal D appears at the audio PCM frame synchronizing signal period in the audio frame period and appears at the horizontal synchronizing signal period in the video frame period.

A counting ratio of the digital frame synchronizing signal generator 327 is determined by the mode switching signal from the video-audio frame detector 211. When the digital frame synchronization is not established, the generator 327 produces a signal having the audio PCM frame period by counting bit clocks, the number of which corresponds to a time duration of the audio PCM frame synchronizing signal. The gate 325 detects a coincidence of said signal and the signal D from the synchronizing pattern detector 179. When these signals do not coincide with each other, the digital frame synchronizing signal having the same timing as the input digital synchronizing signal can be obtained by preventing the bit clocks from being passed through the gate 325.

FIG. 28 shows the detailed construction of the counter in the digital frame synchronizing signal generator 327. The counter comprises three four-bit counters 333, 335, 337. These counters may be an IC 9316 manufactured by FAIRCHILD Company. The logic symbol of the four-bit counter is shown in FIG. 29 and its pin functions are illustrated in a Table 6.

Table 6

PIN FUNCTIONS

Inputs
$\overline{CP}$ — Clock pulse (positive edge)
$C_{EF}$ — Count enable parallel
$C_{ET}$ — Count enable trickle
MR — Master reset (asynchronous)
PE — Parallel enable (synchronous)
$P_0$, $P_2$, $P_3$ — Parallel (preset) inputs (synchronous)
Outputs
TC — Terminal count
$Q_0$, $Q_1$, $Q_2$, $Q_3$ — Counter outputs
Logic equations
Count enable $= E_{EP} \cdot C_{ET} \cdot \overline{PE}$
$TC = Q_1 \cdot Q_2 \cdot Q_3 \cdot Q_{ET}$
Preset $= PE \cdot CP^+$ (rising clock edge)
Reset = MR
Note: PE and MR are active low inputs implying the pins are $\overline{PE}$ and MR. Therefore reset $= \overline{MR}$ implies pin 1 must be low to reset.

In FIG. 28, the counter 333 operates as an one-fourth counter. The counter 333 produces an output 1 at its output terminal TC when parallel output terminals $Q_0$, $Q_1$, $Q_2$ and $Q_3$ are 1, 1, 1 and 1. Then, a parallel enable input terminal PE receives 0 and at a timing of a next bit clock, input data 0011 at parallel input terminals $P_0$, $P_1$, $P_2$ and $P_3$ are written in the counter and the parallel output terminals $Q_0$, $Q_1$, $Q_2$ and $Q_3$ produce output signals 0011. Then, the output signal at the terminal TC becomes 0 and thus the input signal to the terminal PE changes to 1. From the next bit clock, the counter 333 operates as a normal counter and its contents change to 1011, 0111, 1111 and to 0011 again. The counter 333 repeats such a cycle so as to operate as the one-fourth counter.

The output from the counter 333 is further counted by the counters 333 and 337. In the video frame period the counters 335 and 337 count down the output from the counter 333 by one one-hundred fourths to produce an output pulse having the horizontal synchronizing signal period at an output terminal 339 and in the audio frame period the counters count down the signal by one one-hundred fifty-sevenths to produce an output pulse of the audio PCM frame synchronizing signal period at the terminal 339. In FIG. 29, a reference numeral 341 shows a coincidence circuit shown in FIG. 30. As shown in FIG. 30, the coincidence circuit 341 comprises eight exclusive OR gates 343, 345, 347, 349, 351, 353, 355 and 357, eight inverters 359, 361, 363, 365, 367, 369, 371 and 373, each being connected to the output of each exclusive OR gate and an AND gate 375 connected to the outputs of the inverters. To each exclusive OR gate are supplied the signals to be compared, i.e., $A_0$, $B_0$; $A_1$, $B_1$; . . . $A_7$, $B_7$. Thus if all of these signals to be compared are identical with each other, all of the exclusive OR gates 343, 345 . . . 357 produce 0 output, so that all inputs to all AND gates 359, 361 . . . 373 are changed to 1 by the inverters and the AND gate 375 produces 1 output. In the audio frame period the output signal from the video-audio frame detector 211 is 1, so that input signals applied to terminals $B_0$, $B_1$, $B_2$, $B_3$, $B_4$, $B_5$, $B_6$ and $B_7$ are 11110001 (a decimal number of 143). The coincidence circuit 341 detects the same signal condition of the counters 335 and 337 applied to terminals $A_0$, $A_1$, $A_2$, $A_3$, $A_4$, $A_5$, $A_6$ and $A_7$. When the circuit 341 detects a coincidence, PE input signal of the counters 335 and 337 changes to 0 and at a timing of a next bit clock the data applied to their parallel input terminals 00101111 (a decimal number of 244) is written into the counters 335 and 337. Then, the PE inputs of the counters are 1 and the counter operates as a normal counter. At last all bits of the counters are 1 (a decimal number of 255). At a next bit clock the contents of the counters return to zero and all bits of the counters are 0. Then, the counters continue to count the bit clocks and when its count value becomes a decimal number of 144, its content jumps to a decimal number 244. The counters 335 and 337 repeat such an operation cyclically, i.e., 0, 1, 2 . . . 143, 244, 245 . . . 255, 0, 1 . . . 143, 244, . . . In this manner, the counters 335 and 337 operate as an one one-hundred fifty-sixths counter. The counting numbers 0, 1 . . . 143 correspond to values 0, 1 . . . 143 of the audio PWD signal.

In the video frame period the output signal from the video-audio frame detector 211 is 0, so that input signals to the terminals $B_0$, $B_1$ . . . $B_7$ of the coincidence circuit 341 are 11011010 (a decimal number of 91). When the circuit 341 detects the same signal condition of the counters 335 and 337, the PE inputs to the counters 335 and 337 changes to 0 and the counters read therein data signals applied to the parallel input terminals at a timing of a next bit clock with a sequence of $P_0$, $P_1$, $P_2$, $P_3$ of the counter 335 and $P_0$, $P_1$, $P_2$, $P_3$ of the counter 337, and thus the signal 00101111 (a decimal number of 244) is written into the counters. Then, the counters operate in the same manner as in the audio-frame period and repeat the following cycle, i.e., 0, 1, 2 . . . 91, 244, 245 . . . 255, 0, 1 . . . 91, 244, . . . In this manner, the counters 335 and 337 operate as the one one-hundred fourth counter in the video frame period.

The forward and backward synchronization protector 331 in FIG. 27 is the same as the protector 195 shown in FIG. 26. In this manner, the digital frame synchronizing signal is regenerated and the video-audio frame detector 211 detects the mode control code $M_0$ and $M_1$ in the digital frame synchronizing signal to discriminate the video frame and the audio frame. In the video frame period the digital frame synchronizing signal generator 327 operates in a video mode by means of the mode selecting signal and produces the horizontal synchronizing signal. In the audio frame period the digital frame synchronizing signal generator 327 operates in an audio mode. In this manner it is possible to derive the digital frame synchronizing signal in accordance with the input digital synchronizing signal. After the vertical synchronization has been established the discrimination of the video or audio frame is effected not by detecting directly the mode control code signals $M_0$ and $M_1$ but by utilizing the periodicity of the video frame and audio frame (for example, by integrating the signals $M_0$ and $M_1$) in order to avoid a spurious mode switching due to noise. After the digital frame synchronization has been completed, the digital frame asynchronizing signal is 0 and then the PCM frame pattern signal is supplied to the bit clock generator 155 through the OR gate 205 to regenerate bit clocks by extracting the PFP signal portions in the received signal. The extracted PFP signal follows the digital synchronizing signal of the input signal, so that it is possible to continue to extract bit clocks even in the video frame period.

Next, the audio frame synchronization will be explained. In order not to extract similar patterns in the input signal after the completion of the digital frame synchronization, the output signal from the digital frame synchronizing signal generator 327 is supplied through the forward and backward synchronization protector 331 to the gate 181 and the output signal A from the synchronizing pattern detector 179 is gated out so as to form a synchronizing information and this information is compared with the signal of the audio frame period from the audio frame synchronizing signal generator 187 and when these signals do not coincide with each other, the bit clocks are inhibited at the gate 181 so as to obtain the audio PCM frame synchronizing output having the same timing as that of the input audio PCM frame synchronizing signal. Once the audio PCM frame synchronization has been settled, the backward synchronization protector 195 protects the synchronizing condition even if the PCM signal is partially erroneous by providing such a feature that the gate 181 is not inhibited unless there are existent successive ten discordances of the synchronization. In the video frame period every other audio frame synchronization signal coincides with the digital synchronizing signal and also in this case, the protector 195 keeps the synchronizing condition. The audio frame synchronizing signal generator 187 is set up by the asynchronous output from the digital frame synchronizing frame signal generator 327 in the asynchronous condition of the digital frame, and thus the synchronizing condition can be completed by the digital synchronizing signal, in which the bit signal A in the MCC signal becomes 1 at first after the digital frame synchronizing condition has been settled.

Next, the horizontal synchronization will be explained. In order not to extract similar patterns in the received signal after the digital frame synchronization has been established, the output signal H from the synchronizing pattern detector 179 is gated out at the gate 183 by the output signal from the digital frame synchronizing signal generator to form a horizontal synchronizing information. This information is compared with the signal having the horizontal synchronizing period from the horizontal synchronizing signal generator 189 and when these signals do not coincide with each other, the bit clocks are inhibited by the gate 183 so as to obtain the horizontal synchronizing output having the same timing as the input horizontal synchronizing signal. The backward synchronization protector 197 is provided to keep the synchronizing condition once it has been established unless ten successive discordances will not be detected. In the audio frame period the horizontal synchronizing signal coincides with the digital frame signal only once for every three periods and the protector 197 protects the synchronizing condition also in such a case. When the digital frame synchronization is not established, the horizontal synchronizing signal generator 189 is set up by the output asynchronous signal of the digital synchronizing signal generator frame. Then, the horizontal synchronizing condition can be completed by the digital synchronizing signal in which the bit signal H becomes 1 at first after the digital frame synchronizing condition has been established.

As to the vertical synchronization the output sigsnal F from the synchronizing pattern detector 179 is gated out by the output signal from the generator 327 at the gate 185 so as to form a vertical synchronizing information. This information is compared with the signal of the vertical synchronizing period from the generator 199 and if they do not coincide with each other, the audio frame synchronizing pulses are inhibited by the gate 185 to obtain the vertical synchronizing output having the same timing as that of the input vertical synchronizing signal. The backward synchronization protector 203 is provided to keep the vertical synchronization once it has been established unless successive three discordances will be detected. The counter of the generator 199 is set up by the asynchronous signal from either digital frame synchronizing signal generator 327 or the audio frame synchronizing frame generator 187. Thus the vertical synchronization can be completed by a first digital synchronizing signal in which the bit signal F is 1 after both of the digital frame synchronization and the audio frame synchronization have been established. In the embodiment shown in FIG. 27 only the backward synchronization protecting function is provided for the audio frame synchronization, video horizontal synchronization and vertical synchronization, and the forward synchronization protecting function is not provided, because the digital frame synchronizing output for triggering is passed through the forward and backward synchronization protector 331 and the forward synchronization protecting action is effected therein.

In the known time division transmission system, the modulation system, the frame frequency and the number of multiplexed channels are fixed inherent to a transmission line to be used. However, in the still picture-sound multiplexing transmission system according to the invention a single transmission line is used in a time division mode so as to transmit the analogue video signal in a certain period, the PCM multiplexed audio signal in another period, and the data information in still another period, so that it is required to carry out the transmission by changing the modulation system, the frame frequency and the number of multiplexed channels. In a receiver for receiving such a signal it is necessary to extract continuously the bit clocks and various synchronizing signals and to maintain these signals. In the embodiments explained above, the bit clocks, the digital frame synchronizing signal, the audio PCM frame synchronizing signal, the horizontal synchronizing signal and the vertical synchronizing signal can be extracted continuously and the synchronizing condition can be maintained, and thus the given audio and video signals can be easily and positively received and reproduced.

FIG. 31 shows an embodiment of a circuit for simultaneously regeneratiang the audio PCM frame synchronizing signal and the horizontal synchronizing signal for use in a case in which J bits composing one frame of the PCM signal cannot be divided by F bits and a residue of $X_1$ bits is produced. In FIG. 31, the received input signal is supplied to a first input terminal 377 and the output bit clocks from the bit clock generator 155 shown in FIG. 17 are supplied to a second input terminal 379. The received input signal is supplied to a synchronizing pattern detector 381 which detects the PFP signal in the input signal. The circuit further comprises inhibition gates 383, 389 and 391, AND gates 385 and 387, first, second and third counters 393, 395 and 397, a synchronization protector 401 and an inverter 403. The first counter 393 counts bit clocks, the number of which is equal to the number of bits included in one channel and produces an output pulse for each channel. The second counter 395 counts the output pulses from the first counter 393, the number of which is equal to the number of channels in one frame. The third counter 397 counts a residue which is produced when the number of bits in one frame is divided for each channel. At an output terminal 399 there is produced alternately the PCM frame synchronizing signal and the horizontal synchronizing signal.

The circuit shown in FIG. 31 operates as follows.

At first, the inhibition gates 389 and 391 are opened and bit clocks to the input terminal 379 are supplied to the first counter 393. The first counter 393 counts bit clocks and produces output pulses having a period of the channel repetition period. The second counter 395 counts these output pulses. When the counter 393 and 395 reach a count up condition, the output signal from the counter 395 passes through the AND gate 385 and inhibits the inhibition gate 391 so as to stop a supply of bit clocks to the counters 393 and 395. When the counter 395 reaches a count up condition its output signal is also supplied to the AND gate 387, so that the AND gate 387 is made opened. Then bit clocks are supplied to the third counter 397 and the counter 397 starts to count the residue. If the third counter 397 also reaches its count-up condition, an output signal having the same period as that of the audio PCM frame synchronizing signal is produced at the output terminal 399 in the audio frame period and an output signal having the same period as that of the horizontal synchronizing signal is produced in the video frame period. At the same time, the output signala from the third counter 397 is supplied to the AND gate 385 through the inverter 403, so that the inhibition gate 391 is released and bit clocks are again supplied to the counter 393. Also at this instance the third counter 397 is reset.

The synchronizing pattern detector 381 detects the PFP signal in the input signal and the inhibition gate 383 collates a timing of the detected PFP signal and that of the output signal from the third counter 397. At first the output signal from the synchronization protector 401 is 0 and the output siginal from the gate 383 is 0, so that the inhibition gate 389 is opened. When the counter 397 reaches a count up condition, the output signal from the protector 401 changes to 1. The output signal from the gate 383 is remained to be 1 until the PFP signal appears in the input signal. Thus, the gate 389 is inhibited and the supply of bit clocks to the counters is inhibited. When the PFP signal appears, the gate 389 is made opened again and the counter 393 starts to count the bit clocks. In this manner, a phase of the output signal of the counter 397 is made synchronized with that of the PFP signal in the input signal. The protector 401 is provided to prevent the inhibition of the gate 389 unless successive five asynchronous conditions will be detected after the synchronization has been established by always producing the output signal 0 after more than five successive coincidences in phase have been detected and making always the gate 389 opened.

It should be noted that the present invention is not restricted to the embodiments explained above and many modifications may be possible within the scope of the invention.

For example, if a bandwidth of a transmission line is wide and an "eye" of the PCM signal transmission is sufficiently opened, it may be permissible to include a jitter to some extent in the bit clocks which are used to decode the PCM signal. In such a case it is not necessary to operate the bit clock generator 155 shown in FIG. 17 only for the PFP signal period, but the bit clock generator may be operated continuously just like in a case that the PCM frame synchronization and the horizontal synchronization have not yet been settled.

Figure 32:
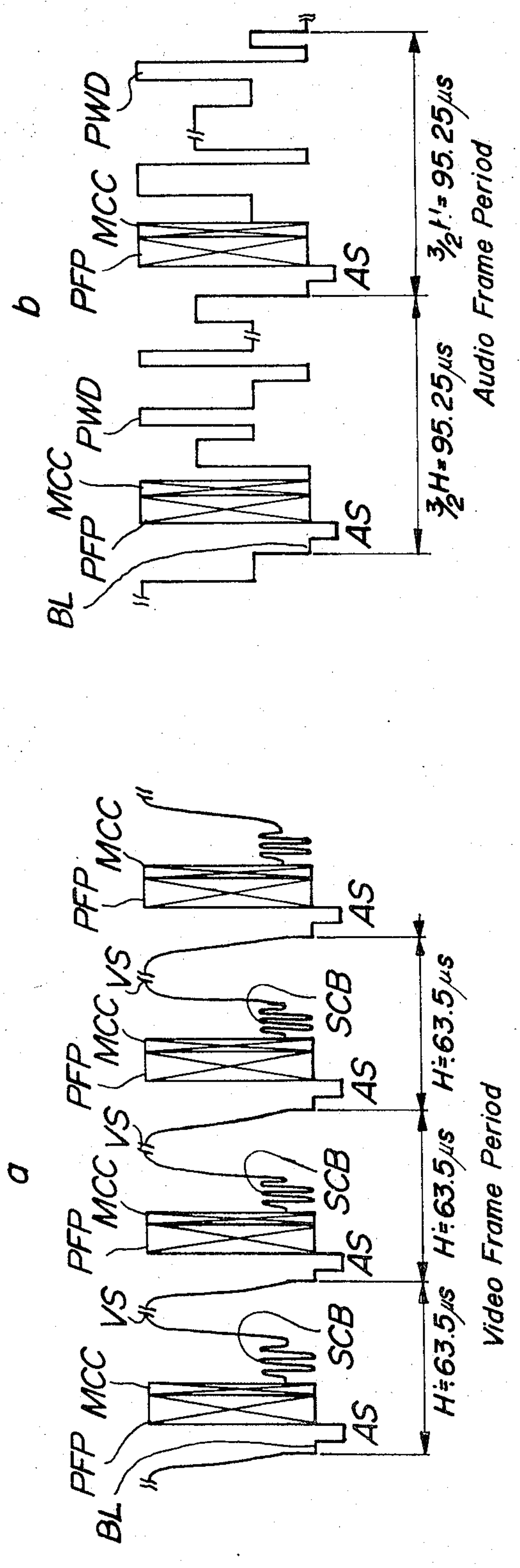

FIG. 32 illustrates modified waveforms of a transmission signal according to the invention. FIG. 32*a* shows the signal in the video frame period and FIG. 32*b* depicts the signal in the audio frame period. In the signal of the present embodiment to the blanking portion BL is added a synchronizing pilot signal AS, an amplitude of which can be separated. This synchronizing signal AS having the separable amlitude is used as a pilot signal so as to extract the PCM frame pattern in the received signal to generate bit clocks. To the signal shown in FIg. 6 or FIG. 32 may be added a pilot signal having a frequency of the bit clock period or of integer multiples of the bit clock period or such a pilot signal may be transmitted through a separate line. In such a case the bit clocks can be more easily reproduced.

In the embodiments mentioned above the synchronous condition is established by means of the PFP signal and the MCC signal. However, according to the invention, the synchronous condition may be settled only by the PFP signal. In such a case at first the PFP signal in the transmitted signal is detected by the PFP pattern detector. The audio PCM frame synchronizing signal generator counts down the bit clocks extracted by the bit clock generator to form the audio PCM frame synchronizing signal. The error detector compares the audio PCM frame synchronizing signal with a position pulse of the detected PFP signal. The audio PCM frame synchronization may be established in the audio frame period, and the horizontal synchronization may be established not in the audio frame period, but in the video frame period. In the bit clock regenerating operation, two bit clock gates are always opened by the audio PCM frame synchronizing signal and the horizontal synchronizing signal, respectively, and the bit clock component lower than a certain level is detected as an error and by means of this detected error the output from the gate is inhibited so as to extract the bit clocks only through the gate from which the larger bit clock component is supplied.

In the above embodiments the transmission system according to the invention has been explained for transmitting still pictures and their related sounds in a time division mode. However, the transmission system according to the invention is not limited to such a still picture and sound transmission system, but may be used to transmit television pictures and facsimile signals. In such a case, horizontal synchronizing signal frequency of the video signal may be selected to 15.75 KHz and a sampling frequency of the facsimile signal may be set to 31.5 KHz. Moreover the transmission system according to the invention may be used to transmit in turns a high quality television video signal and a low quality television video signal. In such a case a horizontal scanning frequency of the low quality television video signal may be, for example, two thirds of a horizontal scanning frequency of the high quality television video signal. In the same manner, the transmission system of the present invention may be used to transmit various signals such as a remote controlling signal, audio signals, facsimile signals in the form of PCM, PPM, PWM or PAM signal.

Advantageous effects of the transmission system according to the invention may be summarized as follows:

1. Since the signal is divided into a plurality of different period, a ratio of these signals is selected as an integer and the synchronizing signals having the same waveform are inserted at said period, a given synchronizing condition can be maintained at any periods.
2. Since control signals for representing the different synchronizing signals are added to the synchronizing signals, the synchronization can be established at any time instance for a given time period and the synchronous condition thus established can be maintained.
3. A device for maintaining the accurate synchronization by utilizing the above synchronizing signal and control signal can be constructed in a simple manner.
4. Since the synchronization can be maintained at any time instance, any kinds of signals which are divided into given periods can be transmitted in a time division mode.
5. Since the synchronization can be maintained at any time instance, different kinds of signals can be transmitted in a time division mode in turns at a time rate of any integer ratio. As the result, different signals can be accurately transmitted through a transmission line having a limited bandwidth.
6. The video signal and audio PCM signal can be transmitted in a time division mode in the same channel, so that a number of still pictures and their related sounds can be transmitted in a limited time interval. Therefore the video signal and audio PCM signal constituting a program can be transmitted repeatedly and thus it is not necessary to provide in a receiver a device for storing the whole program and the construction of the receiver can be simplified. Thus, a useful broadcasting system can be achieved.
7. A plurality of signals each divided into given periods can be transmitted in a multiplexing mode in turns at a time rate of any integer ratio by suitably selecting one or more frequencies of, for example the pulse transmission frequency, the audio PCM frame frequency, the video horizontal synchronizing frequency and the number of scanning lines composing one television frame so as to satisfy the equations (2), (4) and (5). Moreover, the synchronization condition can be established at any time instance by selecting any parameters. That is, since the timings of the various synchronizing signals are continuous at any time instance, the device can operate stably.
8. An amount of each signal to be transmitted in a given time interval with maintaining the synchronizing condition can be selected to an arbitrary value.
9. Therefore, a degree of freedom of expressing the contents of programs can be increased with keeping the synchronizing condition.

What is claimed is:

1. A time division multiplexing transmission system for transmitting first and second information signals in turns at a time rate of a given integer ratio, said first and second information signals being divided at periods of first and second signals, respectively, said transmission system comprises at a transmitter end a signal generator for producing an original signal having a given frequency;

a first circuit for producing said first signal having a first frequency which is equal to a fraction of an integer of said given frequency of said original signal;

a second circuit for producing said second signal having a second frequency which has a relation of an integer ratio with respect to said first frequency;

a third circuit for producing a third signal having a third frequency which is equal to fractions of integers of said first and second frequencies;

a fourth circuit for producing a fourth signal having a fourth frequency which is equal to a fraction of an integer of said third frequency;

a gate circuit for alternately passing said first and second signals at a time rate of said given integer ratio under a control of a gate signal formed by said fourth signal; and a digital synchronizing signal generator which is triggered by an output signal from said gate circuit and produces a digital synchronizing signal composed of a synchronizing information consisting of a pulse chain of a given repetition frequency and first and second control signals each consisting of a pulse chain, pulses of which pulse chain appear at given time slots in synchronism with occurrence instances of said first, second and third signals, said synchronizing information of the given repetition frequency being of the common waveform in both of said first and second signal periods, but said first control signal which is produced in said first signal period being different from said second control signal which is produced in said second signal period; whereby said synchronizing information and first control signal are inserted in said first information signal divided at said first signal period and said synchronizing information and second control signal are inserted in said second information signal divided at said second signal period, and said transmission system further comprises at a receiver end means for extracting said pulse chain having the given repetition frequency from said synchronizing information of the common waveform inserted in said first and second information signals which have been transmitted in turns at a time rate of said given integer ratio and producing clock pulses having a repetition frequency which is equal to said repetition frequency of said extracted pulse chain;

means for extracting said first and second control signals on the basis of the produced clock pulses; and means for forming first and second synchronizing signals having said first and second frequencies, respectively, from said clock pulses, whereby said first and second synchronizing signals and said extracted first and second control signals are collated to each other and said means for forming said first and second synchronizing signals is controlled by a collation output so as to produce said first and second synchronizing signals of said first and second frequencies, respectively, in synchronism with a transmitted signal and said first and second information signals are reproduced by means of said first and second synchronizing signals.

2. A time division multiplexing transmission system as claimed in claim 1, wherein a period of said pulse chain of said given repetition frequency constructing said synchronizing information is made equal to a period of said original signal of said given frequency.

3. A time division multiplexing transmission system as claimed in claim 2, wherein at least one of said first and second information signal is a pulse modulation signal and a bit synchronizing signal for decoding said pulse modulation signal is extracted from said pulse chain constracting said synchronizing information.

4. A time division multiplexing transmission system as claimed in claim 1, wherein said given frequency of said original signal is $f_p$, said first frequency is $f_a$ and said second frequency is $f_b$, and these frequencies satisfy the following relation, $$f_p = If_a = Jf_b$$

here $I$ and $J$ are positive integers and equal to the numbers of waves of the given frequency component in periods of said first and second signals, respectively.

5. A time division multiplexing transmission system as claimed in claim 1, wherein said first information signal is an audio PCM signal and said second information signal is a video signal of a still picture, and further said first signal is a PCM frame synchronizing signal, said second signal is a video horizontal synchronizing signal and said original signal of the given frequency is a bit synchronizing signal for decoding said audio PCM signal.

6. A time division multiplexing transmission system as claimed in claim 1, wherein said first information signal is an audio PPM signal and said second information signal is a video signal of a still picture, and further said first signal is a PPM frame synchronizing signal and said second signal is a video horizontal synchronizing signal.

7. A time division multiplexing transmission system as claimed in claim 1, wherein said first information signal is an audio PAM signal and said second information signal is a video signal of a still picture and further said first signal is a PAM frame synchronizing signal and said second signal is a video horizontal synchronizing signal.

8. A time division multiplexing transmission system as claimed claim 1, wherein said first information signal is an audio PWM signal and said second information signal is a video signal of a still picture, and further said first signal is a PWM frame synchronizing signal and said second signal is a video horizontal synchronizing signal.

9. A time division multiplexing transmission system as claimed in claim 5, wherein said synchronizing information of said digital synchronizing signal is formed by a pulse modulation frame synchronizing signal of a fixed pattern, said first and second control signals are formed by a mode control code, which mode control code comprises a code bit for indicating a coincidence of the digital synchronizing signal and the horizontal synchronizing signal, a code bit for indicating a coincidence of the digital synchronizing signal and the pulse modulation frame synchronizing signal, a code bit for indicating a coincidence of the digital synchronizing signal and a video vertical synchronizing signal and at least one code bit for representing the video signal transmission period or the audio signal transmission period.

10. A time division multiplexing transmission system as claimed in claim 9, wherein said pulse modulation frame synchronizing signal of a fixed pattern is constructed by a substantially regular pattern having partially irregular portions such as 001010 . . . 0100.

11. A time division multiplexing transmission system as claimed in claim 9, wherein said digital synchronizing signal is preceded by a blanking signal and in said blanking signal is inserted a pilot signal having a separable amplitude.

12. A time division multiplexing transmission system as claimed in claim 1, wherein said given integer ratio at a time rate of which said first and second information signals are transmitted in turns is made equal to an integer ratio of a television frame period.

13. A time division multiplexing transmission system as claimed in claim 1, wherein said second frequency of said second signal is made equal to a horizontal synchronizing frequency of a television signal.

14. A time division multiplexing transmission system as claimed in claim 1, wherein said given frequency of said original signal has a relation of an integer ratio with respect to a color sub-carrier frequency of a color television signal.

15. A transmitter for use in the time division multiplexing transmission system for transmitting first and second information signals in turns at a time rate of a given integer ratio, said first and second information signals being divided at periods of first and second signals, respectively as claimed in claim 1, comprises

- a signal generator for producing an original signal having a given frequency;
- a first circuit for producing said first signal having a first frequency which is equal to a fraction of an integer of said given frequency of said original signal;
- a second circuit for producing said second signal having a second frequency which has a relation of an integer ratio with respect to said first frequency;
- a third circuit for producing a third signal having a third frequency which is equal to fractions of integers of said first and second frequencies;
- a fourth circuit for producing a fourth signal having a fourth frequency which is equal to a fraction of an integer of said third frequency;
- a gate circuit for alternately passing said first and second signals at a time rate of said given integer ratio under a control of a gate signal formed by said fourth signal; and
- a digital synchronizing signal generator which is triggered by an output signal from said gate circuit and produces a digital synchronizing signal composed of a synchronizing information consisting of a pulse chain of a given repetition frequency and first and second control signals each consisting of a pulse chain, pulses of which pulse chain appear at given time slots in synchronism with occurrence instances of said first, second and third signals, said synchronizing information of the given repetition frequency being of the common waveform in both of said first and second signal periods, but said first control signal in said first signal period being different from said second control signal in said second signal period; whereby said synchronizing information and first control signal are inserted in said first information signal divided at said first signal period and said synchronizing information and second control signal are inserted in said second information signal divided at said second signal period.

16. A transmitter as claimed in claim 15, wherein each of said first, second, third and fourth circuits is constructed by a frequency divider.

17. A transmitter as claimed in claim 15, wherein said digital synchronizing signal generator is formed by a shift register having a plurality of parallel input terminals, a series input terminal, a series output terminal and a parallel enable terminal for changing a mode of said shift register so as to permit parallel inputs; to parallel input terminals for setting the synchronizing information is supplied a fixed input signal corresponding to said pulse chain of said synchronizing information; to parallel input terminals for setting said control signal are supplied said first, second and third signals, separately; to said parallel enable terminal is supplied the output signal from said gate circuit; and to said series input terminal is supplied said original signal of said given frequency; whereby said first or second signal supplied to said parallel input terminal is written in said shift register and the content in the shift register is driven by said original signal of the given frequency supplied to said series input terminal so as to produce from said series output terminal a pulse chain forming said synchronizing information and a pulse chain forming said first or second control signal at the given period of said original signal.

18. A transmitter as claimed in claim 16, wherein said shift register comprises at least five parallel input terminals for setting said control signal, to a first parallel input terminal is connected an output of said second frequency divider, to a second parallel input terminal is connected an output of said first frequency divider, to a third parallel input terminal is connected an output of said third frequency divider, to a fourth parallel input terminal is connected an output of said fourth frequency divider through an inverter and to a fifth parallel input terminal is connected said output of said fourth frequency divider.

19. A transmitter for use in the transmission system as claimed in claim 14, wherein said transmitter comprises

- a signal generator for producing an original signal having a given frequency;
- a first circuit for producing said first signal having a first frequency which is equal to a fraction of an integer of said given frequency of said original signal;
- a second circuit for producing said second signal having a second frequency which has a relation of an integer ratio with respect to said first frequency;
- a third circuit for producing a third signal having a third frequency which is equal to fractions of integers of said first and second frequencies;
- a fourth circuit for producing a fourth signal having a fourth frequency which is equal to a fraction of an integer of said third frequency;
- a gate circuit for alternately passing said first and second signals at a time rate of said given integer ratio under a control of a gate signal formed by said fourth signal;
- a digital synchronizing signal generator which is triggered by an output signal from said gate circuit and produces a digital synchronizing signal composed of a synchronizing information consisting of a pulse chain of a given repetition frequency and first and second control signals each consisting of a pulse chain, pulses of which pulse chain appear at given time slots in synchronism with occurrence instances of said first, second and third signals, said synchronizing information of the given repetition frequency being of the common waveform in both of said first and second signal periods, but said first control signal which is produced in said first signal period being different from said second control signal which is produced in said second signal period; whereby said synchronizing information and first control signal are inserted in said first information signal divided at said first signal period and said synchronizing information and second control signal are inserted in said second information signal divided at said second signal period, a synchronizing signal generator for producing said color sub-carrier, a horizontal driving signal and a vertical driving signal in synchronism with an external color television signal supplied to said synchronizing signal generator; and a reset pulse generator for receiving said horizontal and vertical driving signals and producing reset pulses for resetting said first and third circuits; whereby said color sub-carrier is supplied to said signal generator so as to produce said original signal of the given frequency which has a relation of an integer ratio with respect to said color sub-carrier frequency and said first and second signals are locked to said external color television signal.

20. A receiver for use in the time division multiplexing transmission system as claimed in claim 1 for transmitting first and second information signals in turns at a time rate of a given integer ratio, said first and second information signals being divided at periods of first and second signals, respectively and said first information signal being transmitted together with a synchronizing information composed of a pulse chain having a given repetition frequency and a first control signal and said second information signal being transmitted together with said synchronizing information and a second control signal, comprises means for extracting said pulse chain having the given repetition frequency from said synchronizing information of the common waveform inserted in said first and second information signals which have been transmitted in turns at a time rate of said given integer ratio and producing clock pulses having a repetition frequency which is equal to said repetition frequency of said extracted pulse chain;

means for extracting said first and second control signals on the basis of the produced clock pulses; and means for forming first and second synchronizing signals having said first and second frequencies, respectively, from said clock pulses; whereby said first and second synchronizing signals and said extracted first and second control signals are collated to each other and said means for forming said first and second synchronizing signals is controlled by a collation output so as to produce said first and second synchronizing signals of said first and second frequencies, respectively, in synchronism with a transmitted signal and said first and second information signals are reproduced by means of said first and second synchronizing signals.

21. A receiver as claimed in claim 20, wherein said means for forming said first and second synchronizing signals of said first and second frequencies comprises a first synchronizing signal generating circuit and a second synchronizing signal generating circuit, these circuits being connected in parallel to said clock pulse producing means; said first synchronizing signal generating circuit comprises a first gate connected to said clock pulse producing means, a first synchronizing signal generator having a counter for counting the clock pulses passed through said first gate and producing a signal of said first frequency and a forward and backward synchronization protector which detects a coincidence between said first control signal from said control signal extracting means and said output signal from said first synchronizing signal generator and produces such conditioning signals to said first gate that in an asynchronous condition of said first synchronizing signal said first gate is always opened until said synchronization protector detects a given number of successive coincidences, after the synchronization protector has detected said given number of successive coincidences, said first gate is opened only for the digital synchronizing signal period in the transmitted signal so as to establish a synchronous condition of the first synchronizing signal and after the synchronous condition has been established, said first gate is opened only for the digital synchronizing signal period unless said synchronization protector detects a given number of successive discordances between said first control signal and said output signal from said first synchronizing signal generator; and said second synchronizing signal generating circuit comprises a second gate connected to said clock pulse producing means, a second synchronizing signal generator having a counter for counting the clock pulses passed through said second gate and producing an output signal of said second frequency and a backward synchronization protector which detects a coincidence between said second control signal from said control signal extracting means and said output signal from said second synchronizing signal and produces such conditioning signals to said second gate that said second gate is always opened before said backward synchronization protector detects said coincidence, after the backward synchronization protector detects said coincidence said second gate is opened only for the digital synchronizing signal period in the transmitted signal so as to establish a synchronous condition of the second synchronizing signal and after the synchronous condition has been established, said second gate is opened only for the digital synchronizing signal period unless said backward synchronization protector detects a given number of successive discordances between said second control signal and said output signal from said second synchronizing signal generator; whereby said first and second synchronizing signal generating circuits are made operative simultaneously so as to generate said first and second synchronizing signals independently.

22. A receiver as claimed in claim 21, wherein there is provided an AND gate between said control signal extracting means and said second gate in said second synchronizing signal generating circuit and to said AND gate are connected the output of said forward and backward synchronization protector and the output of said control signal extracting means, from which output terminal is supplied said second control signal; whereby said second gate is always closed until the synchronous condition is established and when the synchronization condition of said first synchronizing signal is established, said second gate is opened only for the digital synchronizing signal period by means of said output signal from said forward and backward synchronization protector and said second control signal through said AND gate so as to establish the synchronous condition in such a manner that at first the synchronous condition of said first synchronizing signal is settled and the synchronous condition of said second synchronizing signal is established immediately after said synchronous condition of the first synchronizing signal has been completed.

23. A receiver as claimed in claim 21, wherein there is further provided in parallel with said first and second synchronizing signal generating circuits a digital synchronizing signal generating circuit which comprises a third gate connected to said clock pulse producing means, a digital synchronizing signal generator having a counter for counting the clock pulses passed through said third gate and producing a digital signal which has said first frequency in the first information signal transmission period and said second frequency in the second information signal transmission period, respectively and a forward and backward synchronization protector which detects a coincidence between said digital synchronizing signal from said generator and said digital synchronizing signal in the transmission signal and produces such conditioning signal to said third gate that in an asynchronous condition of said digital synchronizing signal said third gate is always opened, after said forward and backward synchronization protector has detected a given number of successive coincidences, said third gate is opened only for the digital synchronizing signal period in a transmitted signal so as to established a synchronous condition of said digital synchronizing signal and after the synchronous condition has been established, said third gate is opened only for said digital synchronizing signal unless said forward and backward synchronization protector detects a given number of successive discordances between said digital synchronizing signal generated from said digital synchronizing signal generator and the digital synchronizing signal in the transmitted signal; the output of said forward and backward synchronization protector is connected to said first and second gates; whereby before the synchronous condition of the digital synchronizing signal is established said first and second gates are always closed and after said synchronous condition has been established said first and second gates are opened only for the digital synchronizing signal period so as to produce said first and second synchronizing signals in synchronism with the transmitted signal; and further said forward and backward synchronization protector has only a backward synchronization protecting function.

24. A receiver as claimed in claim 21 wherein said forward and backward synchronization protector comprises

- a first AND gate for detecting said coincidences;
- a second AND gate for detecting said discordances;
- a coincidence counter for counting said coincidences and producing an output coincidence signal when it counts said given number of successive coincidences;
- a discordance counter for counting said discordances and producing an output discordance signal when it counts said given number of successive discordances; and
- a third AND gate for receiving said output synchronizing signal from said synchronizing signal generator and said output discordance signal and producing said conditioning signal, whereby said discordance counter and said coincidence counter are reset by said output coincidence signal and said output discordance signal, respectively.

25. A receiver as claimed in claim 21, wherein said backward synchronization protector comprises

- a first AND gate for detecting said discordances;
- a discordance counter for counting said discordances and producing an output discordance signal when it counts said given number of successive discordances;
- a second AND gate for detecting said coincidence and supplying said coincidence as a reset signal to said discordance counter; and
- a third AND gate for receiving said synchronizing signal generated from said synchronizing signal generator and said output discordance signal and producing said conditioning signal.

26. A receiver as claimed in claim 20, wherein said means for extracting said control signal comprises

- a shift register having a plurality of stages, the number of which is at least equal to the number of bits forming said digital synchronizing signal in the transmitted signal, the successive bits of the digital synchronizing signal of the transmitted signal being written in said successive stages of said shift register;
- a coincidence detector having comparison input terminals connected to given stages of said shift register corresponding to the synchronizing information of the given pattern and reference input terminals connected to given potentials in accordance with said given pattern of said synchronizing information; and
- a gate circuit having one input terminal connected to the output of said coincidence detector and other input terminals connected to given stages of said shift register corresponding to said control signal.

27. A receiver as claimed in claim 20, wherein said means for producing the clock pulses comprises

- a gate for receiving the input transmitted signal;
- a phase comparator connected to an output of said gate;
- a sample-hold circuit connected to said phase comparator; and
- a controlled oscillator for producing said clock pulses, said clock pulses generated from said oscillator being fedback to said phase comparator which produces an output corresponding to a phase error between the input signal and said clock pulses, whereby in the asynchronous condition said gate and sample-hold circuit are made always operative and after the synchronous condition has been established, said gate and sample-hold circuit is made operative only for the digital synchronizing signal period of the transmitted signal.

28. A receiver as claimed in claim 23, wherein said digital synchronizing signal generator comprises a counter for counting the clock pulses; and a coincidence detector for comparing the content of said counter with a reference signal; whereby in the first information signal transmission period said reference signal for said coincidence detector is of a first reference signal under the control of said first control signal and when the content of said counter coincidences with said first reference signal, said coincidence detector produces an output signal, by means of which the count value of said counter is jumped by a given amount so as to produce an output signal of said first frequency and in the second information signal transmission period said reference signal is of a second reference signal under the control of said second control signal and when the content of said counter coincides with said second reference signal, said coincidence circuit produces an output signal, by means of which the count value of said counter is jumped by a given amount so as to produce an output signal of said second frequency.

29. A receiver as claimed in claim 20, wherein said means for extracting first and second synchronizing signal comprises a first gate connected to said clock pulse generating means and having one gate terminal connected to said control signal extracting means;

a second gate having one input terminal connected to said first gate;

a first counter connected to said second gate and for counting clock pulses passed through said first and second gates;

a third gate connected to said first counter;

a second counter connected to said third gate and for counting the clock pulses passed through said first gate;

a fourth gate having input terminals connected to output terminals of said first and second counters and an output terminal connected to the other input terminal of said second gate; and a synchronization protector having an input terminal connected to an output of said second counter and an output terminal connected to the other gate terminal of said first gate; whereby at first said second gate is made opened, but said third gate is made closed so that said first counter counts a given number of the clock pulses, and when said first counter reaches its count up condition, said second gate is made closed through said fourth gate and at the same time said third gate is made opened so that said second counter starts to count the clock pulses, and further said second counter produces said first synchronizing signal in said first information signal transmission period and said second synchronizing signal in said second information signal transmission period.

* * * * *